US009143560B2

(12) United States Patent
Koganti et al.

(10) Patent No.: US 9,143,560 B2
(45) Date of Patent: Sep. 22, 2015

(54) METHODS AND APPARATUS FOR DATASET SYNCHRONIZATION IN A WIRELESS ENVIRONMENT

(75) Inventors: Sudheer B. Koganti, San Diego, CA (US); Brian H. Kelley, San Diego, CA (US); Matthew Hohlfeld, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1138 days.

(21) Appl. No.: 12/142,023

(22) Filed: Jun. 19, 2008

(65) Prior Publication Data
US 2009/0077263 A1 Mar. 19, 2009

Related U.S. Application Data

(60) Provisional application No. 60/945,088, filed on Jun. 19, 2007.

(51) Int. Cl.
G06F 15/16 (2006.01)
G06F 7/00 (2006.01)
G06F 17/00 (2006.01)
H04L 29/08 (2006.01)
G06F 17/30 (2006.01)

(52) U.S. Cl.
CPC ...... *H04L 67/1095* (2013.01); *G06F 17/30575* (2013.01)

(58) Field of Classification Search
CPC ............ H04L 67/1095; H04L 29/0854; G06F 17/30575; G06F 17/30581
USPC ......... 709/201, 206, 219, 227, 246, 248, 203, 709/204, 217, 230, 232; 455/420; 707/610, 707/611
See application file for complete search history.

(56) References Cited

U.S. PATENT DOCUMENTS 5,155,847 A 10/1992 Kirouac et al.
5,473,772 A 12/1995 Halliwell et al.
(Continued)

FOREIGN PATENT DOCUMENTS

CN 1288199 3/2001
CN 1937533 A 3/2007
(Continued)

OTHER PUBLICATIONS

Castro P., et al., "Before-Commit Client State Management Services for AJAX Applications", Hot Topics in Web Systems and Technologies, 2006. HOTWEB '06. 1st IEEE Workshop on, IEEE, PI, Nov. 1, 2006, pp. 1-12, XP031082790, ISBN: 978-1-4244-0595-4, abstract sections I., II.C, II.D, III., IV.F, IV.G, V.C, V.D, VII.
(Continued)

*Primary Examiner* — Tae Kim
(74) *Attorney, Agent, or Firm* — Shirin Tefagh; Joseph Agusta

(57) ABSTRACT

Methods, apparatus, systems, and computer program products are provided for wirelessly synchronizing datasets that are stored on a wireless device and at a network device, such as a network server or database. Present aspects provide for a simplified and efficient synchronization process, whereby synchronization can be completed in a single round-trip of wireless communication between the wireless device and the network device. Single round-trip synchronization provides for less use of network resources, shorter overall synchronization cycle times and lessens the likelihood of wireless network failures, such as call drops or the like, causing the synchronization process to fail. Additionally, simplification and efficiency are further realized by creating a synchronization process that allows the network dataset to be independent of the wireless device datasets, i.e., the network server does not require a full change history nor is the network server required to know the wireless device dataset version.

36 Claims, 10 Drawing Sheets

(56) References Cited

U.S. PATENT DOCUMENTS

| | | | |
|---|---|---|---|
| 5,564,051 | A | 10/1996 | Halliwell et al. |
| 5,612,682 | A | 3/1997 | DeLuca et al. |
| 5,761,618 | A | 6/1998 | Lynch et al. |
| 5,848,064 | A | 12/1998 | Cowan |
| 5,913,213 | A | 6/1999 | Wikstrom et al. |
| 5,920,821 | A | 7/1999 | Seazholtz et al. |
| 5,995,756 | A | 11/1999 | Herrmann |
| 6,006,034 | A | 12/1999 | Heath et al. |
| 6,009,274 | A | 12/1999 | Fletcher et al. |
| 6,023,620 | A | 2/2000 | Hansson |
| 6,031,830 | A | 2/2000 | Cowan |
| 6,061,683 | A | 5/2000 | Alonso |
| 6,074,434 | A | 6/2000 | Cole et al. |
| 6,128,489 | A | 10/2000 | Seazholtz et al. |
| 6,167,567 | A | 12/2000 | Chiles et al. |
| 6,199,204 | B1 | 3/2001 | Donohue |
| 6,272,333 | B1 | 8/2001 | Smith |
| 6,272,677 | B1 | 8/2001 | Lam et al. |
| 6,308,061 | B1 | 10/2001 | Criss et al. |
| 6,314,565 | B1 | 11/2001 | Kenner et al. |
| 6,327,617 | B1 | 12/2001 | Fawcett |
| 6,360,366 | B1 | 3/2002 | Heath et al. |
| 6,389,423 | B1 | 5/2002 | Sakakura |
| 6,397,060 | B1 | 5/2002 | Oikawa |
| 6,418,554 | B1 | 7/2002 | Delo et al. |
| 6,493,871 | B1 | 12/2002 | McGuire et al. |
| 6,564,048 | B1 | 5/2003 | Sugita |
| 6,590,881 | B1 | 7/2003 | Wallace et al. |
| 6,636,872 | B1 | 10/2003 | Heath et al. |
| 6,643,506 | B1 | 11/2003 | Criss et al. |
| 6,687,901 | B1 | 2/2004 | Imamatsu |
| 6,735,625 | B1 | 5/2004 | Ponna |
| 6,735,766 | B1 | 5/2004 | Chamberlain et al. |
| 6,748,209 | B2 | 6/2004 | Lipsit |
| 6,754,894 | B1 | 6/2004 | Costello et al. |
| 6,789,255 | B1 | 9/2004 | Pedrizetti et al. |
| 6,807,415 | B2 | 10/2004 | Sato |
| 6,832,373 | B2 | 12/2004 | ONeill |
| 6,868,455 | B1 | 3/2005 | Ariyama |
| 6,877,037 | B1 | 4/2005 | Adachi |
| 6,909,898 | B2 | 6/2005 | Mielke et al. |
| 6,961,764 | B2 | 11/2005 | Mizoguchi |
| 6,966,060 | B1 | 11/2005 | Young et al. |
| 6,970,960 | B1 | 11/2005 | Sarfati |
| 7,080,371 | B1 | 7/2006 | Arnaiz et al. |
| 7,127,712 | B1 | 10/2006 | Noble et al. |
| 7,140,013 | B2 | 11/2006 | TE'eni et al. |
| 7,149,508 | B2 | 12/2006 | Herle |
| 7,149,792 | B1 | 12/2006 | Hansen et al. |
| 7,194,258 | B2 | 3/2007 | Okita et al. |
| 7,243,163 | B1 * | 7/2007 | Friend et al. ............. 709/248 |
| 7,287,097 | B1 * | 10/2007 | Friend et al. ............. 709/248 |
| 7,391,759 | B2 | 6/2008 | Wallace et al. |
| 7,415,706 | B1 | 8/2008 | Raju et al. |
| 7,512,638 | B2 | 3/2009 | Jhaveri et al. |
| 7,516,451 | B2 | 4/2009 | Peng |
| 7,529,780 | B1 * | 5/2009 | Braginsky et al. ............. 1/1 |
| 7,530,065 | B1 | 5/2009 | Ciudad et al. |
| 7,555,750 | B1 | 6/2009 | Lilley |
| 7,596,720 | B2 | 9/2009 | Curtis et al. |
| 7,603,447 | B2 * | 10/2009 | Hodgson ............. 709/221 |
| 7,657,886 | B1 | 2/2010 | Chen et al. |
| 7,669,197 | B1 | 2/2010 | O'neill et al. |
| 7,676,792 | B2 | 3/2010 | Irie et al. |
| 7,698,698 | B2 | 4/2010 | Skan |
| 7,747,567 | B2 * | 6/2010 | Teegan et al. ............. 707/610 |
| 7,752,626 | B1 | 7/2010 | Pandey et al. |
| 7,788,662 | B2 | 8/2010 | Haselden et al. |
| 7,797,695 | B2 | 9/2010 | Motta |
| 7,840,957 | B2 | 11/2010 | Kumashiro et al. |
| 7,844,964 | B2 | 11/2010 | Marolia |
| 7,870,412 | B2 * | 1/2011 | Maes ............. 713/400 |
| 7,958,502 | B2 | 6/2011 | Motta et al. |
| 7,971,199 | B1 | 6/2011 | Chen |
| 7,974,613 | B1 | 7/2011 | Shanker et al. |
| 7,987,449 | B1 | 7/2011 | Marolia et al. |
| 8,245,218 | B2 | 8/2012 | Giambalvo et al. |
| 8,311,981 | B2 * | 11/2012 | Braginsky et al. ............. 707/618 |
| 8,316,224 | B2 | 11/2012 | Vidal et al. |
| 8,340,635 | B2 | 12/2012 | Herz et al. |
| 8,443,361 | B2 | 5/2013 | Vidal et al. |
| 8,495,621 | B2 | 7/2013 | Traut et al. |
| 8,522,232 | B1 | 8/2013 | Carter et al. |
| 8,555,273 | B1 | 10/2013 | Chia et al. |
| 8,595,715 | B2 | 11/2013 | Ward et al. |
| 8,612,398 | B2 | 12/2013 | Jarrett et al. |
| 8,612,516 | B2 | 12/2013 | Mallur et al. |
| 8,612,961 | B2 | 12/2013 | Stewart |
| 8,620,272 | B2 | 12/2013 | Ganatra et al. |
| 8,635,608 | B2 | 1/2014 | Ramesh et al. |
| 8,762,977 | B2 | 6/2014 | Olsson et al. |
| 8,893,109 | B2 | 11/2014 | Birtwhistle et al. |
| 8,918,775 | B1 | 12/2014 | Carpenter et al. |
| 2001/0029178 | A1 | 10/2001 | Criss et al. |
| 2001/0029605 | A1 | 10/2001 | Forbes et al. |
| 2001/0048728 | A1 | 12/2001 | Peng |
| 2001/0052052 | A1 | 12/2001 | Peng |
| 2001/0053688 | A1 | 12/2001 | Rignell et al. |
| 2002/0016956 | A1 | 2/2002 | Fawcett |
| 2002/0077094 | A1 | 6/2002 | Leppanen |
| 2002/0078209 | A1 | 6/2002 | Peng |
| 2002/0091799 | A1 | 7/2002 | Katz et al. |
| 2002/0100035 | A1 | 7/2002 | Kenyon et al. |
| 2002/0131404 | A1 | 9/2002 | Mehta et al. |
| 2002/0157090 | A1 | 10/2002 | Anton, Jr. |
| 2002/0177437 | A1 | 11/2002 | Chesavage et al. |
| 2002/0178178 | A1 | 11/2002 | Peng |
| 2002/0194578 | A1 | 12/2002 | Irie et al. |
| 2003/0023516 | A1 | 1/2003 | Sharrow et al. |
| 2003/0046676 | A1 | 3/2003 | Cheng et al. |
| 2003/0078036 | A1 | 4/2003 | Chang et al. |
| 2003/0100297 | A1 | 5/2003 | Riordan et al. |
| 2003/0105847 | A1 | 6/2003 | Jennery et al. |
| 2003/0124974 | A1 | 7/2003 | Asami |
| 2003/0143991 | A1 | 7/2003 | Minear et al. |
| 2003/0145315 | A1 | 7/2003 | Aro et al. |
| 2004/0003266 | A1 | 1/2004 | Moshir et al. |
| 2004/0003389 | A1 | 1/2004 | Reynar et al. |
| 2004/0006630 | A1 | 1/2004 | Friend et al. |
| 2004/0015953 | A1 | 1/2004 | Vincent |
| 2004/0024795 | A1 * | 2/2004 | Hind et al. ............. 707/204 |
| 2004/0038675 | A1 | 2/2004 | Criss et al. |
| 2004/0068724 | A1 | 4/2004 | Gardner et al. |
| 2004/0107417 | A1 | 6/2004 | Chia et al. |
| 2004/0117785 | A1 | 6/2004 | Kincaid |
| 2004/0158817 | A1 | 8/2004 | Okachi et al. |
| 2004/0181790 | A1 | 9/2004 | Herrick |
| 2004/0188510 | A1 | 9/2004 | Sprigg et al. |
| 2004/0188511 | A1 | 9/2004 | Sprigg et al. |
| 2004/0205745 | A1 | 10/2004 | Piazza |
| 2004/0224674 | A1 | 11/2004 | O'farrell et al. |
| 2004/0230965 | A1 | 11/2004 | Okkonen |
| 2005/0044235 | A1 * | 2/2005 | Balahura et al. ............. 709/227 |
| 2005/0118991 | A1 | 6/2005 | Koganti et al. |
| 2005/0132357 | A1 | 6/2005 | Shell et al. |
| 2005/0268296 | A1 | 12/2005 | Marolia et al. |
| 2006/0031262 | A1 | 2/2006 | Satoh et al. |
| 2006/0206888 | A1 | 9/2006 | Mavrinac et al. |
| 2006/0277408 | A1 * | 12/2006 | Bhat et al. ............. 713/173 |
| 2007/0006222 | A1 | 1/2007 | Maier et al. |
| 2007/0074203 | A1 | 3/2007 | Curtis et al. |
| 2007/0162517 | A1 * | 7/2007 | Teegan et al. ............. 707/201 |
| 2007/0169073 | A1 | 7/2007 | O'Neill et al. |
| 2007/0169093 | A1 | 7/2007 | Logan et al. |
| 2007/0293212 | A1 * | 12/2007 | Quon et al. ............. 455/420 |
| 2008/0003991 | A1 | 1/2008 | Sievers et al. |
| 2008/0028385 | A1 | 1/2008 | Brown et al. |
| 2008/0082853 | A1 * | 4/2008 | Maes ............. 713/400 |
| 2008/0148250 | A1 | 6/2008 | Motta |
| 2008/0270481 | A1 * | 10/2008 | Augustine ............. 707/200 |
| 2008/0270485 | A1 | 10/2008 | Yu et al. |
| 2008/0281828 | A1 * | 11/2008 | Swartz et al. ............. 707/10 |
| 2010/0242034 | A1 | 9/2010 | Rugh et al. |
| 2011/0078675 | A1 | 3/2011 | Van et al. |

(56) References Cited

U.S. PATENT DOCUMENTS

| | | | |
|---|---|---|---|
| 2011/0252415 | A1 | 10/2011 | Ricci |
| 2012/0180037 | A1 | 7/2012 | McCaleb et al. |
| 2013/0047145 | A1 | 2/2013 | Cui |
| 2013/0139139 | A1 | 5/2013 | Mallur et al. |
| 2013/0198732 | A1 | 8/2013 | Fujita |
| 2013/0326493 | A1 | 12/2013 | Poonamalli et al. |
| 2014/0053145 | A1 | 2/2014 | Steigleder |
| 2014/0128054 | A1 | 5/2014 | Koganti et al. |
| 2014/0130035 | A1 | 5/2014 | Desai et al. |
| 2014/0208306 | A1 | 7/2014 | Halder et al. |

FOREIGN PATENT DOCUMENTS

| | | | |
|---|---|---|---|
| DE | 19543843 | A1 | 5/1997 |
| EP | 0841615 | A2 | 5/1998 |
| EP | 0959635 | A1 | 11/1999 |
| EP | 1672545 | A1 | 6/2006 |
| GB | 2348721 | | 10/2000 |
| JP | 1198477 | | 8/1989 |
| JP | 5210507 | A | 8/1993 |
| JP | 08106393 | | 4/1996 |
| JP | 9292980 | A | 11/1997 |
| JP | 10021061 | A | 1/1998 |
| JP | 10049354 | A | 2/1998 |
| JP | 11110197 | A | 4/1999 |
| JP | 11225359 | A | 8/1999 |
| JP | H11331937 | A | 11/1999 |
| JP | H11514760 | A | 12/1999 |
| JP | 2000132355 | | 5/2000 |
| JP | 2000132397 | A | 5/2000 |
| JP | 2000276335 | A | 10/2000 |
| JP | 2001043073 | A | 2/2001 |
| JP | 2001053882 | A | 2/2001 |
| JP | 2001101219 | A | 4/2001 |
| JP | 2001251380 | A | 9/2001 |
| JP | 2001256053 | A | 9/2001 |
| JP | 2001296994 | A | 10/2001 |
| JP | 2001337832 | A | 12/2001 |
| JP | 2001356912 | A | 12/2001 |
| JP | 2002215692 | A | 8/2002 |
| JP | 2002278767 | A | 9/2002 |
| JP | 2005174048 | A | 6/2005 |
| JP | 2008536344 | A | 9/2008 |
| JP | 2009134589 | A | 6/2009 |
| JP | 2012091840 | A | 5/2012 |
| KR | 19990057991 | | 7/1999 |
| KR | 1020020009741 | | 2/2002 |
| KR | 20030030044 | A | 4/2003 |
| KR | 20030033396 | A | 5/2003 |
| KR | 20040069963 | | 8/2004 |
| RU | 2233033 | C2 | 7/2004 |
| TW | 361057 | | 6/1999 |
| TW | 448404 | B | 8/2001 |
| TW | 473660 | B | 1/2002 |
| TW | 503368 | B | 9/2002 |
| WO | WO-9102313 | A1 | 2/1991 |
| WO | WO-9729606 | A1 | 8/1997 |
| WO | WO-9838820 | | 9/1998 |
| WO | WO-9945465 | | 9/1999 |
| WO | WO-0077614 | | 12/2000 |
| WO | WO-0169888 | | 9/2001 |
| WO | WO-0193030 | A1 | 12/2001 |
| WO | WO-0246914 | | 6/2002 |
| WO | WO-02075525 | | 9/2002 |
| WO | 03083667 | A1 | 10/2003 |
| WO | 2007056954 | A1 | 5/2007 |

OTHER PUBLICATIONS

International Search Report and Written Opinion—PCT/US2008/067565—ISA/EPO—Dec. 11, 2008.

Mesbah A., et al., "An Architectural Style for AJAX", Software Architecture, 2007, WICSA '07. The Working IEEE/IFIP Conference on Jan. 1, 2007, pp. 1-10, XP031013840 ISBN: 978-0-7695-2744-4, abstract sections 2.2, 4.2, 4.3, 4.4.
Open Mobile Alliance, "DS Protocol Approved Version 1.2 OMA-TS-DS_Protocol-V1_2-2-20060710-A", Internet Citation, [Online] Jul. 10, 2006, XP002456758 Retrieved from the Internet: <URL: http://www.openmobilealliance.org/release_program/docs/DS/V1_2-2-200607 10-A/OMA-TS-DS-Protocol-V1_2-20060710-A.pdf> [ retrieved on Oct. 26, 2007] sections 5., 6.12, 9.
Dolgolaptev, V.G., "Rabota v Windows 95 na primerakh", (Operation in Windows 95 by Examples)—Moscow, Vostochnaya Knizhnaya Kompania (East Book Company), published on 1997, 464 pp.
Grundy et al., "Engineering Plug-In SW Components to Support Collaborative Work", Software—Practice and Experience, 2002, vol. 32, Wiley, pp. 938-1013. <https://www.cs.auckland.ac.nz/~john.../spe2002.p...>.
La Manna V.P, "Dynamic Software Update for Component-based Distributed Systems", Jun. 2011, Boulder, Colorado, USA, pp. 1-8; <http://dl.acm.org/results.cfm?h=1&source_query=&&cfid=304794976&cftoken=79323359>.
Tromcek Z., "Semi-Automatic Component Upgrade with RefactoringNG", 2011 IEEE, pp. 907-910, http://ieeexplore.ieee.org/stamp/stamp.jsp?tp=&arnumber=6078310.
Gui N., et al., "A Framework for Adaptive Real-Time Applications: The Declarative Real-Time OSGi Component Model", ACM, ARM, Leuven, Belgium, Dec. 1, 2008,. pp. 35-40.
Lucredio D., et al., "Orion—A Component-Based Software Engineering Environment", Journal of Object Technology, vol. 3, No. 4,, Apr. 2004, pp. 51-74;.
Yang X., et al., "A Component-based Software Framework for Product Lifecycle Information Management for Consumer Products", Consumer Electronics, IEEE Transactions on, May 2007, pp. 1195-1203.
OMA "SyncML HTTP Binding," Approved version 1.2—Feb. 21, 2007, Open Mobile Alliance, OMA-TS-SyncML_HTTPBinding-V1_2-20070221-A, pp. 1-24.
Baggiolini et al., "Toward Automatic, Run-time Fault Management for Component-Based Applications", 1998 Springer, pp. 1-5, <http://link.springer.com/content/pdf/10.1007/3-540-69687-3_67.pdf>.
OMA "SyncML Meta Information," Approved version 1.2—Feb. 21, 2007, Open Mobile Alliance, OMA-TS-SyncML_MetaInfo-V1_2-20070221-A, pp. 1-25.
OMA "SyncML OBEX Binding," Approved version 1.2—Feb. 21, 2007, Open Mobile Alliance, OMA-TS-SyncML_OBEXBinding-V1_2-20070221-A, pp. 1-30.
OMA "SyncML Representation Protocol," Approved version 1.2—Feb. 21, 2007, Open Mobile Alliance, OMA-SyncML-RepPro-V1_2-20070221-A, pp. 1-60.
OMA "SyncML Server Alerted Notification," Approved version 1.2—Feb. 21, 2007, Open Mobile Alliance, OMA-TS-SyncML_SAN-V1_2-20070221-A, pp. 1-17.
OMA "SyncML WSPBinding," Approved version 1.2—Feb. 21, 2007, Open Mobile Alliance, OMA-TS-SyncML_WSPBinding-V1_2-20070221-A, pp. 1-17.
SyncML Representation Protocol, Version 1.0.1, [retrieved on Jun. 15, 2001], 105 Pages, Retrieved from the Internet: URL: http://www.syncml.org/docs/syncml_represent_v101_20010615.pdf.
Tijs Van Der Storm., "Continuous Release and Upgrade of Component-Based Software", 2005 ACM, Sep. 5, 2005, SCM'05, pp. 43-57, http://dl.acm.org/results.cfm?h=1&cfid=603384239&cftoken=64589296.
Annosi., et al., "Managing and Assessing the Risk of Component Upgrades", 2012 IEEE, Please'12, Jun. 4, 2012, pp. 9-12,.
Gu., et al., "Low-disruptive Dynamic Updating of Java Applications", 2014 Elsevier, vol. 56, Issue 9, Sep. 2014, pp. 1086-1098;.
Nguyen T N., "Component-based Software Update Process in Collaborative Software Development", 2008 IEEE, APSEC'08, Dec. 3-5, 2008, pp. 437-444,.

* cited by examiner

| DATA SET ID | DATA SET VERSION NO. | DATA ITEM A | DATA ITEM 1 CHANGE INDICATOR 0 – NO CHANGE 1 – UPDATE/INSERT 2 - DELETE | DATA ITEM B | ITEM 2 CHANGE INDICATOR 0 1 2 | DATA ITEM C | ITEM 3 CHANGE INDICATOR 0 1 2 |
|---|---|---|---|---|---|---|---|
| 70 | 19 | 36 (38 38 38 38 38 38) | 72 | 36 (38 38 38 38) | 72 | 36 (38 38) | 72 |

METHODS AND APPARATUS FOR DATASET SYNCHRONIZATION IN A WIRELESS ENVIRONMENT

CLAIM OF PRIORITY UNDER 35 U.S.C. §119

The present Application for patent claims priority to Provisional Application No. 60/945,088 entitled "METHODS AND APPARATUS FOR DATASET SYNCHRONIZATION IN A WIRELESS ENVIRONMENT" filed Jun. 19, 2007, and assigned to the assignee hereof and hereby expressly incorporated by reference herein.

BACKGROUND

1. Field

The disclosed aspects relate to wireless communication devices, and more particularly, to systems, methods and apparatus for wirelessly synchronizing datasets stored on the wireless communication device with corresponding datasets stored at a network site.

2. Background

Synchronization is the process by which a single file, otherwise referred to as a dataset, is synchronized between two or more devices. The process is carried out by automatically copying changes back and forth amongst the devices until the dataset is generally equivalent amongst the devices.

Synchronization of files or datasets is becoming more commonplace in the wireless environment. For example, a user's contact list stored on one wireless device can be synchronized with other wireless devices or with networked databases. Synchronization of datasets is especially beneficial in instances in which applications are used in an off-line mode prior to moving to an on-line mode, which triggers data exchange. An exemplary application includes electronic mail (email), in which a user inputs email during an off-line mode and the email is subsequently sent to network database once the device is returned to on-line mode. The synchronization process is also implemented in community-type environments, in which multiple users interact through a shared network database. For example, in the wireless environment, gaming communities, which allow users to participate in real-time video games, also provide for gaming information to be stored and shared at a central network database. Such community activities are also prone to use in an off-line mode, in which a user can make changes to the user's locally stored database and the changes are synchronized with the network database when the user moves to an on-line mode.

In one approach, synchronization can be conducted locally, by docking a wireless device, such as a personal data assistant (PDA) or the like to a docking device having a serial connection to a personal computer. This type of synchronization requires the wireless device and the computer to be in close proximity to one another. However, the advent of more powerful wireless devices has made it possible to remotely synchronize datasets over the wireless network.

Remote synchronization of data has been accomplished via Synchronization Markup Language (SyncML), which provides a common data synchronization protocol for wireless networks. SyncML relies on eXtensible Markup Language (XML) as the underlying carrier protocol for all SyncML communications transpiring during the wireless synchronization ("sync") session. As such, multiple messages are sent between the wireless device and the network server during any one sync session. Additionally, the data structure of each message is large resulting in a high bandwidth requirement to exchange the messages. Thus, SyncML is a relatively complex synchronization process that necessitates the exchange of multiple messages, demands a large amount of network bandwidth, and requires a relatively long amount of time for completion. The complexity of the SyncML process, coupled with the limitations of cellular networks (e.g., potential loss of signal, bandwidth limitations, etc.), causes the synchronization process to be less than reliable. For example, failure to make a connection or dropping a connection during the synchronization process often results in the need to perform a full synchronization process. During a full synchronization process, the entire dataset is communicated to the wireless device or network, as opposed to just the changes that have occurred.

Therefore, a need exists to develop a synchronization process for the wireless development that is less complex, more efficient, and more robust than current wireless solutions.

SUMMARY

In this regard, simplicity may be realized by the present aspects, which use less network resources and require less in terms of historical data than current wireless sync processes. The use of less network resources can result in a more efficient sync process, as the time to complete a sync cycle can decrease. Additionally, the described synchronization process allows wireless network failures to occur without mandating the need for a full synchronization of the dataset between a server and a wireless device.

In particular, present aspects provide for methods, devices, systems, and computer program products for wirelessly synchronizing datasets that are stored on a wireless device and at a network device, such as a network server or database. Present aspects provide for a simplified and efficient synchronization process, whereby synchronization can be completed in a single round-trip of wireless communication between the wireless device and the network device. Single round-trip communication provides for less use of network resources, shorter overall synchronization cycle times and lessens the likelihood of wireless network failures, such as call drops or the like, causing the synchronization process to fail. Additionally, simplification and efficiency are further realized by creating a synchronization process that allows the network dataset to be independent of the wireless device datasets, i.e., the network server may not require a full change history and the network server may not be required to know the wireless device dataset version. Present aspects also provide for a robust synchronization process, such that, communication failures allow for re-application of the synchronization process without having to implement a full synchronization of the datasets. In this regard, present aspects are suited for synchronizing datasets that are used in a wireless community-type environment, such as a wireless gaming community or the like, or in applications that provide for offline mode use, such as email, gaming, and the like.

In one aspect, a method for synchronization of a dataset on a wireless device is defined. The method includes generating a synchronization request message for a dataset that includes a current wireless device dataset version, communicating, wirelessly, the synchronization request message to a network device and receiving, wirelessly, in response to the communication of the synchronization request message, a synchronization confirmation message that includes a network device dataset version number. The synchronization request message and the synchronization confirmation message are operable to provide synchronization based on a single round-trip of communication between the wireless device and the network device. In some aspects, the method may include changing the current wireless device version number to the network dataset version number if the network dataset version number in the confirmation message differs from the current wireless device version number. Additionally, the synchronization confirmation message may include a synchronization status indicator and/or a network device change list that includes one or more changed data items in the network device dataset and thus the method may include changing the wireless device dataset according to the network device change list.

In some aspects of the method, generating a synchronization request message may further include verifying status of a change indicator for each data item in the wireless device dataset, compiling a wireless device change list that includes one or more changed data items based on the change indicator for one or more of the data items indicating a change and including the wireless device change list in the synchronization request message.

In some aspects, the synchronization request message and the synchronization confirmation message are communicated via a lightweight data-interchange carrier protocol, such as JavaScript Object Notation (JSON) protocol.

In some aspects, if the synchronization status indicator indicates a synchronization failure, the method may further include initiating full synchronization between the wireless device and the network device based on the synchronization failure indicator. In other aspects, if the wireless device fails to receive the synchronization confirmation message after a predetermined time period a new synchronization session may be initiated by generating and communicating a synchronization request message.

A further related aspect is provided for by at least one processor. The processor is configured to include a first module for generating a synchronization request message for a dataset that includes a current wireless device dataset version number, a second module for communicating, wirelessly, the synchronization request message to a network device and a third module for receiving, wirelessly, in response to the communication of the synchronization request message, a synchronization confirmation message that includes a network device dataset version number. The synchronization request message and the synchronization confirmation message are operable to provide synchronization based on a single round-trip of communication between the wireless device and the network device.

Another related aspect is defined by a computer program product that includes a computer-readable medium. The medium includes at least one instruction for causing a computer to generate a synchronization request message for a dataset that includes a current wireless device dataset version number, at least one instruction for causing the computer to communicate, wirelessly, the synchronization request message to a network device, and at least one instruction for causing the computer to receive wirelessly, in response to the communication of the synchronization request message, a synchronization confirmation message that includes a network device dataset version number. The synchronization request message and the synchronization confirmation message are operable to provide synchronization based on a single round-trip of communication between the wireless device and the network device.

Yet another related aspect is defined by an apparatus. The apparatus includes means for generating a synchronization request message for a dataset that includes a current wireless device dataset version number, means for communicating, wirelessly, the synchronization request message to a network device and means for receiving, wirelessly, in response to the communication of the synchronization request message, a synchronization confirmation message that includes a network device dataset version number. The synchronization request message and the synchronization confirmation message are operable to provide synchronization based on a single round-trip of communication between the wireless device and the network device.

A further aspect is provided for by a wireless communication device. The device includes a computer platform including a memory and at least one processor, a dataset stored in the memory and including a plurality of data items and a synchronization module stored in the memory, and executable by the at least one processor. The synchronization module is operable to generate a synchronization request message for the dataset that includes a current wireless device dataset version number, communicate the synchronization request message to a network device, and receive, in response to the communication of the synchronization request message, a synchronization confirmation message that includes a network device dataset version number. The synchronization request message and the synchronization confirmation message are operable to provide synchronization based on a single round-trip of communication between the wireless device and the network device. The synchronization module may further be operable to change the current wireless device version number to the network dataset version number if the network device dataset version number in the confirmation message differs from the current wireless device version number. The synchronization module may further be operable to receive a synchronization confirmation message that includes a synchronization status indicator and/or a network device change list that includes one or more changed data items in the network device dataset and, the apparatus may be operable to change the wireless device dataset according to the network device change list.

In alternate aspects, the synchronization module is further operable to verify a status of a change indicator for each data item in the wireless device dataset, compile a wireless device change list that includes one or more changed data items based on the status change indicator and including the wireless device change list in the synchronization request message.

In some aspects of the wireless device, the synchronization request message and the synchronization confirmation message are communicated via a lightweight data-interchange carrier protocol, such as JavaScript Object Notation (JSON) protocol.

In some aspects of the wireless device, the synchronization module is further operable to receive a synchronization confirmation message that includes a synchronization failure indicator and is further operable to initiate full synchronization between the wireless device and the network device.

Yet another aspect is provided for by a method for synchronization of a dataset on a network device. The method includes receiving, wirelessly, at a network device, a synchronization request message that includes a wireless device dataset version number, comparing the wireless device dataset version number to a current network device dataset version number, compiling a network device dataset change list that includes one or more changed data items if the comparison indicates that the wireless device dataset version number differs from the network device dataset version number, generating a synchronization confirmation message that includes the current network device dataset version number and any compiled network device dataset change list and communicating, wirelessly, the synchronization confirmation message. The synchronization request message and the synchronization confirmation message are operable to provide synchronization based on a single round-trip of communication between a wireless device and the network device.

In some aspects of the method, receiving a synchronization request message may further include receiving a synchronization request message that includes a wireless device dataset change list that includes one or more changed data items and changing in the network device dataset the changed data items included in the wireless device dataset change list. In some aspects of the method, making changes to the network device dataset may include providing a deletion indicator for data items that have been deleted on the wireless device dataset without deleting the data item from the network device dataset.

Some aspects of the method may further include updating a data item version number based upon the change in the data item and updating the network device dataset version number to reflect the version number of a highest sequenced changed data item. In such aspects, generating a synchronization confirmation message may include generating a synchronization confirmation message that includes the updated network device dataset version number and any compiled network device dataset change list.

In some aspects of the method, the synchronization request message and the synchronization confirmation message are communicated via a lightweight data-interchange carrier protocol, such as JavaScript Object Notation (JSON) protocol.

A further aspect is provided for by at least one processor. The processor includes a first module for receiving, wirelessly, at a network device, a synchronization request message that includes a wireless device dataset version number, a second module for comparing the wireless device dataset version number to a current network device dataset version number, a third module for compiling a network device dataset change list that includes one or more changed data items if the comparison indicates that the wireless device dataset version number differs from the network device version number, a fourth module for generating a synchronization confirmation message that includes the current network device dataset version number and any compiled network device dataset change list and a fifth module for communicating, wirelessly, the synchronization confirmation message. The synchronization request message and the synchronization confirmation message are operable to provide synchronization based on a single round-trip of communication between a wireless device and the network device.

Another related aspect is defined by a computer program product that includes a computer-readable medium. The medium includes at least one instruction for causing a computer to receive, wirelessly, at a network device, a synchronization request message that includes a wireless device dataset version number, at least one instruction for causing the computer to compare the wireless device dataset version number to a current network device dataset version number and at least one instruction for causing the computer to compile a network device dataset change list that includes one or more changed data items if the comparison indicates that the wireless device dataset version number differs from the network device dataset version number. The medium also includes at least one instruction for causing the computer to generate a synchronization confirmation message that includes the current network device dataset version number and any compiled network device dataset change list and at least one instruction for causing the computer to communicate, wirelessly, the synchronization confirmation message. The synchronization request message and the synchronization confirmation message are operable to provide synchronization based on a single round-trip of communication between a wireless device and the network device.

Yet another aspect is provided for by an apparatus. The apparatus includes means for receiving, wirelessly, at a network device, a synchronization request message that includes a wireless device dataset version number, means for comparing the wireless device dataset version number to a current network device dataset version number and a means for compiling a network device dataset change list that includes one or more changed data items if the comparison indicates that the wireless device dataset version number differs from the network device dataset version number. The apparatus additionally includes means for generating a synchronization confirmation message that includes the current network device dataset version number and any compiled network device dataset change list and means for communicating, wirelessly, the synchronization confirmation message. The synchronization request message and the synchronization confirmation message are operable to provide synchronization based on a single round-trip of communication between a wireless device and the network device.

An aspect is also provided for by a network device. The network device includes a computer platform including a memory and at least one processor, a dataset stored in the memory and including a plurality of data items and a synchronization module stored in the memory and executable by the at least one processor. The synchronization module is operable to receive a synchronization request message that includes a wireless device dataset version number, compare the wireless device dataset version number to a current network device dataset version number, compile a network device dataset change list that includes one or more changed data items if the comparison indicates that the wireless device dataset version number differs from the network device dataset version number, generate a synchronization confirmation message that includes the current network device dataset version number and any compiled network device dataset change list and communicating, wirelessly, the synchronization confirmation message. The synchronization request message and the synchronization confirmation message are operable to provide synchronization based on a single round-trip of communication between a wireless device and the network device.

Thus, one or more of the present aspects provide for wirelessly synchronizing datasets that are stored on a wireless device and at a network device, such as a network server or database. As described, the present aspects provide for a simplified and efficient synchronization process, whereby synchronization can be completed in a single round-trip of wireless communication between the wireless device and the network device. Single round-trip communication provides for less use of network resources, shorter overall synchronization cycle times and lessens the likelihood of wireless network failures, such as call drops or the like, causing the synchronization process to fail. Additionally, simplification and efficiency are further realized by creating a synchronization process that allows the network dataset to be independent of the wireless device datasets, i.e., the network server does not require a full change history nor is the network server required to know the wireless device dataset version. Present aspects also provide for a robust synchronization process, such that, communication failures allow for re-application of the synchronization process without having to implement a full synchronization of the datasets.

BRIEF DESCRIPTION OF THE DRAWINGS

FIG. 2 is a block diagram of wireless device dataset for synchronization, according to an aspect;

DETAILED DESCRIPTION

The present devices, apparatus, methods, computer-readable media, and processors now will be described more fully hereinafter with reference to the accompanying drawings, in which aspects of the invention are shown. The devices, apparatus, methods, computer-readable media and processors may, however, be embodied in many different forms and should not be construed as limited to the aspects set forth herein; rather, these aspects are provided so that this disclosure will be thorough and complete, and will fully convey the scope of the invention to those skilled in the art. Like numbers refer to like elements throughout.

As used herein, the word "exemplary" means "serving as an example, instance, or illustration." Any aspect described herein as "exemplary" is not necessarily to be construed as preferred or advantageous over other aspects.

One or more aspects described herein are in connection with a wireless communication device. A wireless communication device can also be called a subscriber station, a subscriber unit, mobile station, mobile, remote station, access point, remote terminal, access terminal, user terminal, user agent, a user device, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

One or more of the present aspects provide for methods, systems, apparatus, and computer program products for wirelessly synchronizing datasets that are stored on a wireless device and at a network device, such as a network server or database. One or more of the present aspects provide for a simplified and efficient synchronization process, whereby synchronization can be completed in a single round-trip of wireless communication between the wireless device and the network device. Additionally, simplification and efficiency are further realized by creating a synchronization process that allows the network dataset to be independent of the wireless device datasets, i.e., the network server may not require a full change history and the network server may not be required to know or keep track of the wireless device dataset version for each wireless device. Present aspects also provide for a robust synchronization process, such that, communication failures allow for re-application of the synchronization process without having to implement a full synchronization of the datasets. In this regard, one or more of the present aspects are suited for synchronizing datasets that are used in a wireless community-type environment, such as a wireless gaming community or the like, or in applications that provide for offline mode use, such as email, gaming, and the like.

Figure 1:
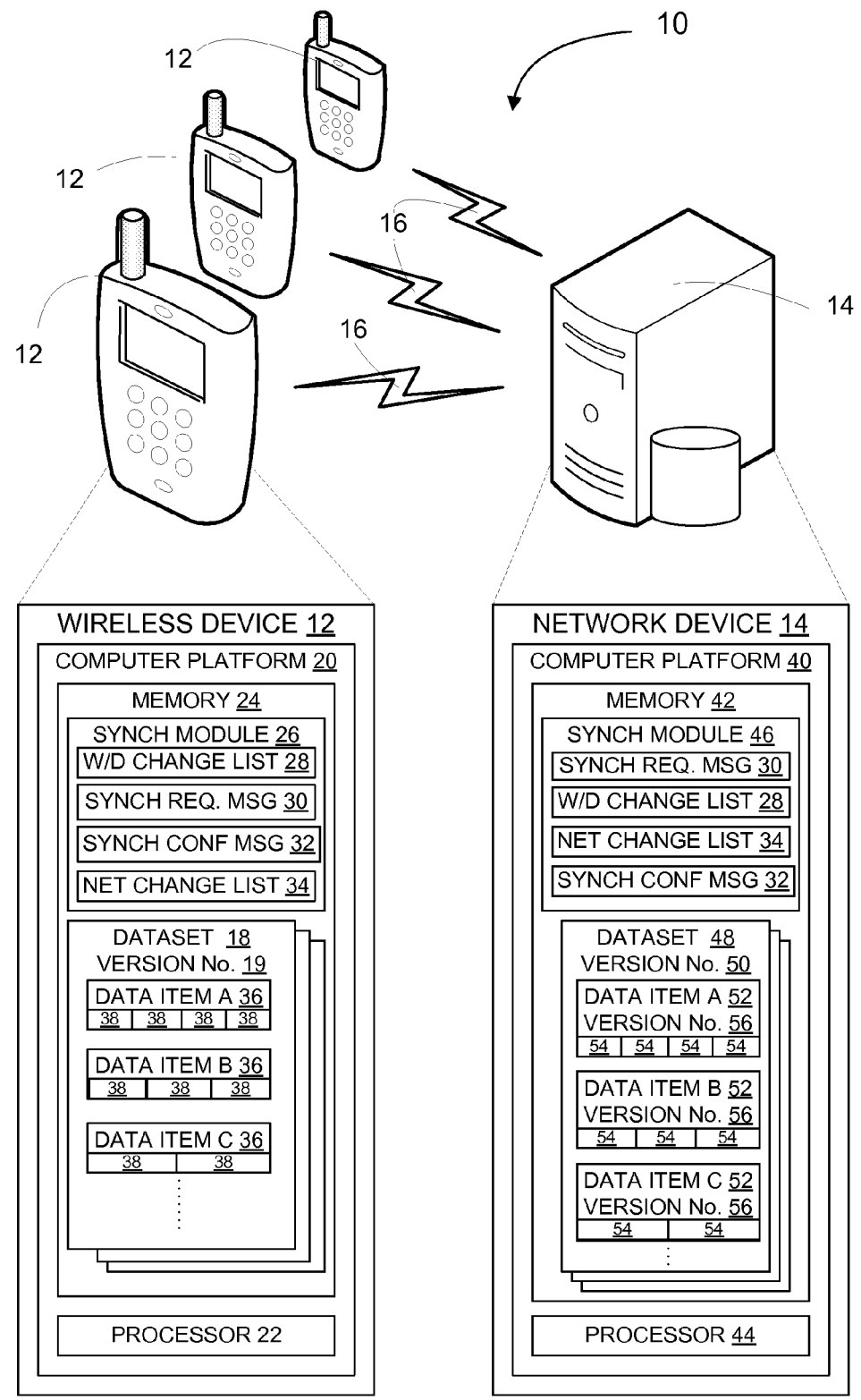
FIG. 1 is a block diagram of a system for wireless synchronization of a dataset stored on one or more wireless devices and a corresponding dataset stored at a network device, according to an aspect.

Referring to FIG. 1, a block diagram depiction of a system for wireless dataset synchronization is provided, according to a present aspect. The system 10 includes one or more wireless devices 12 and a network device 14, such as a network server having a corresponding database, which are in wireless communication via wireless network 16. One or more of wireless devices 12 and network device 14 will store a dataset 18 and 48 that requires synchronization. In some aspects, for example, in a wireless community-type environment, network device 14 may initially distribute network device dataset 48 to one or more wireless devices 12, which store the received dataset as a wireless device dataset 18. Over time, either or both of network server 14 and one or more wireless devices 12 may update their respective dataset 48 and 18. As such, system 10 provides apparatus and methods that allow one or more wireless devices 12 and network device 14 to synchronize their respective datasets 18 and 48 through wireless communication.

Wireless device 12 includes a computer platform 20 having a processor 22 and a memory 24. The memory 24 of wireless device 12 includes a synchronization module 26 operable to synchronize datasets 18 and 48. The synchronization module 26 may rely on a lightweight data-interchange protocol as the carrier protocol in order to limit the synchronization process to a single round-trip of wireless communication between the wireless device 12 and the network device 14. A lightweight data-interchange protocol may characteristically be built on two structures, a collection of name/pair values, and an ordered list of values. The name/value pairs may include an object, a record, a structure, a dictionary, a hash table, a keyed list, an associative array, or the like. The ordered list of values may include an array, a vector, a list, a sequence, or the list. One example of a lightweight data-interchange protocol is JavaScript™ Object Notation (JSON). In JSON an object is an unordered set of name/value pairs, an array is an ordered collection of values and a value can be a string, a number, a true/false/null indicator, an object or an array. Unlike other data-interchange protocols, JSON supports arrays and, as such requires simpler syntax and less markup. The regular and simple syntax structure of JSON, combined with built-in numeric and array support offers better advantages over other data-interchanges protocols in terms of simpler parsing, closer representation of data structures and smaller sized message.

The synchronization module 26 is operable to generate a synchronization request message 30, which is transmitted to network device 14 and which operates to ask for dataset synchronization with network device 14. Synchronization request message 30 forms the first leg of the single round-trip synchronization process. In some aspects, synchronization module 26 may further compile a wireless device change list 28 that indicates the changes made to a dataset 18 since the prior synchronization process. Changes may include additions, insertions, and/or deletions to the dataset 18. The synchronization module 26 is also operable for communicating the wireless device change list 28 to the network device 14, for example, in the synchronization request message 30. The synchronization module 26 is also operable to receive a synchronization confirmation message 32, which forms the second leg of the single round-trip synchronization process. Synchronization confirmation message 32 acts to verify completion of the sync process. Further, synchronization confirmation message 32 may include a network device change list 34 that indicates the changes made to the corresponding network dataset 48 since the prior synchronization process. Thus, system 10 advantageously provides for synchronization between wireless device dataset 18 and network device dataset 48 in a single round-trip via synchronization request message 30 and synchronization confirmation message 32.

Wireless device dataset 18 will characteristically have a version number 19 that indicates the dataset version corresponding to network database version from the last synchronization with the network database. Further, each wireless device dataset 18 will include one or a plurality of data items 36. Data items 36 may include one or more data fields 38. It should be noted that although the illustrated data items 36 include different numbers of data fields, any data item 36 might include any number of data fields 38. In accordance with some aspects, changes made to the dataset are reflected in terms of data items 36 as opposed to data fields 38, e.g. if any field of a respective data item is changed, then the respective data item is considered to be changed. Thus, to provide a synchronization process having an idempotent nature, meaning that changes to a wireless device dataset result in the same change to the network dataset and/or another wireless device dataset, the wireless device change list 28 includes changes with respect to data items. Hence, the wireless device change list 28 includes the entirety of any data item that is being added or deleted, or to which corresponding data fields have been added, deleted, or changed.

Network device 14 includes a computer platform 40 having a processor 42 and a memory 44. The memory 44 of network device 14 includes a synchronization module 46 operable to synchronize network device dataset 48 with one or more wireless device datasets 18. Similar to synchronization module 26 on the wireless devices 12, the synchronization module 46 may utilize the same lightweight data-interchange protocol as the carrier protocol in order to reduce bandwidth and to allow the synchronization process to occur in a single round-trip of wireless communication between the wireless device 12 and the network device 14.

The synchronization module 46 is operable to receive synchronization request message 30 and implement any wireless device change list 28 in the request message 30. The synchronization module 46 is also operable to compile network change list 34 that indicates the changes made to the network dataset 48 since the prior synchronization process undertaken by the respective wireless device 12. In other words, network device change list 34 comprises the "delta" or net changes in network dataset 48 based on the difference between the received wireless device dataset version 19 and network dataset version 50. The synchronization module 46 is additionally operable for communicating the network device change list 34 to the requesting wireless device 12 in the synchronization confirmation message 32.

In accordance with present aspects, the network dataset 48 will differ from the corresponding wireless device dataset 18 in terms of how changes are indicated. The network dataset 48 will characteristically have a version number 50 that indicates the network dataset version. Each dataset 48 will include one or a plurality of data items 52. Similar to the data items 36 that form the wireless device datasets 18, each data item 52 may include one or more data fields 54. In accordance with present aspects, changes made to the network dataset 48 are reflected in terms of data items 32, which indicate a change to one or more data fields 54.

Each data item 50 in the network dataset 48 will have a corresponding version number 56 that indicates the current data item version. In one aspect, data item version numbers 56 are unique across all data items, and are updated based on changes made to a respective data item. For example, in some aspects, the network dataset version number 50 reflects the highest numbered data item version number 56. As such, in one aspect, when the network device 14 receives a synchronization request message 30, which indicates the current wireless device dataset version number 19, and after executing any wireless device change list 28, the synchronization module 46 compares the network device dataset version number 50 to the wireless device version number 19 and compiles a network device change list 34 that includes data items 52 having version numbers 56 greater than the wireless device version number 19 (i.e., the delta between the current wireless device dataset version number 19 and the current network device dataset version number 50). In one aspect, in order to provide the respective wireless device 12 only with net changes after executing wireless device change list 28, thereby further reducing the size of the message, any data item 52 having a version 56 within the delta based on wireless device change list 28 will not be included in network device change list 34. In such a case, the respective wireless device 12 already has in the wireless device's wireless device dataset 18 the latest value of the respective data item. Further explanation of data item version numbers 56 and how they are used to compile the network device change list 34 will be discussed infra.

FIG. 2 is block diagram representation of a wireless device dataset 18, according to a present aspect. The dataset 18 includes dataset identifier 70 that indicates the dataset id/name and dataset version number 19 that indicates the current dataset version number. The dataset version number 19 may be updated upon successful completion of the synchronization process. The dataset 18 also includes one or a plurality of data items 36 each having one or more data fields 38. As previously noted, changes made to the dataset can be reflected in terms of data items 36 as opposed to data fields 38. Thus, to insure the idempotent nature of the synchronization process, meaning that changes to a wireless device dataset result in the same change to the network dataset and/or another wireless device datasets, the wireless device change list includes changes in the form of data items. The dataset 18 also includes a change indicator 72 for each data item that indicates whether a change has occurred in the data item since the prior synchronization process. In one aspect, the change indicator field 72 may comprise a dirty bit to indicate a change to a data item. The dirty bit provides for a data item to be marked or flagged based on alteration or change.

For example, in one aspect, the change indicator 72 may have a value of "0" if the associated data item has not undergone any changes since the prior synchronization process. Further, the change indicator 72 may have a value of "1" if the associated data item has been updated (e.g., insertion, deletion or change to a data item) or if the respective data item is a newly added data item. Additionally, the change indicator 72 may have a value of "2" if the respective data item has been deleted. The change indicator is used in compiling the wireless device change list 28 (as shown in FIG. 1). If a change indicator 72 indicates a change, for example, if the indicator is set to "1" or "2," the corresponding data item will be included in the wireless device change list 28. Once the synchronization process is successfully completed, all of the change indicators are reset to indicate no change has been made, for example, reset to "0."

According to one aspect, it may be necessary to distinguish, via the change indicator 72, between data items that have been updated or added (e.g. data items having a change indicator set to "1") versus data items that have been deleted (e.g. data items having a change indicator set to "2"). This is because the network dataset treats deletion of data items differently than changes to or additions of data items, and, therefore, the network needs to be notified, via the change list 28, if a data item has been deleted.

Figure 3:
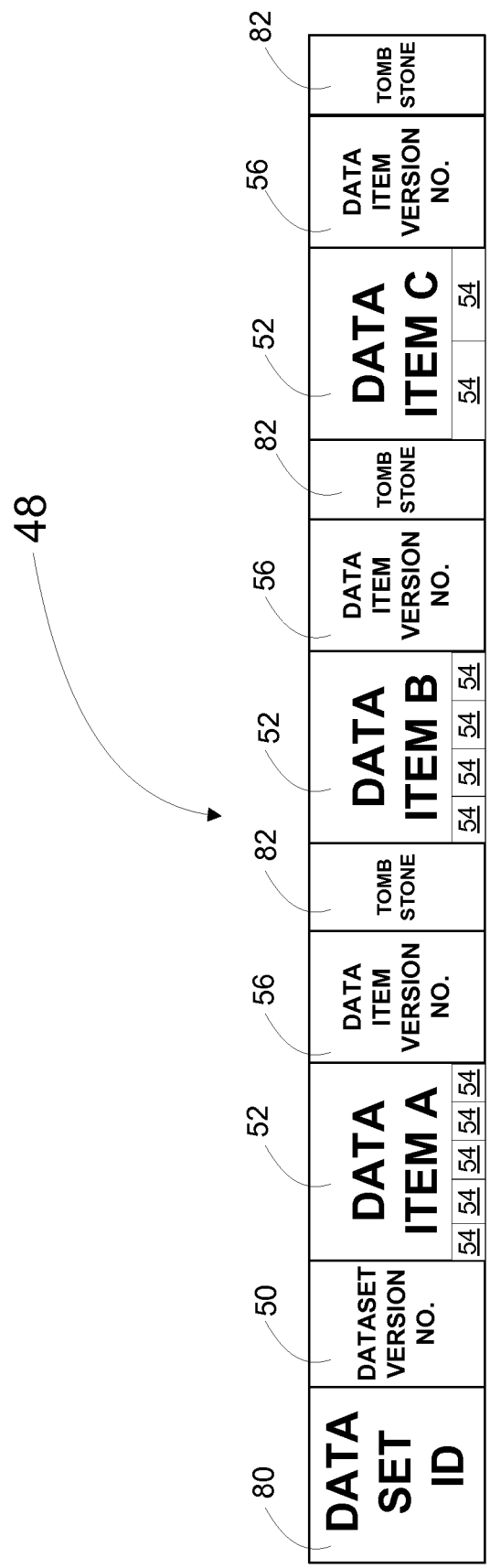
FIG. 3 is a block diagram of a network device dataset for synchronization, according to an aspect.

FIG. 3 is block diagram representation of a network device dataset 48, according to a present aspect. The network device dataset 48 includes a network device dataset identifier 80 that indicates the dataset id/name and dataset version number 50 that indicates the current dataset version number. The network device dataset 48 also includes a plurality of data items 52 each having one or more data fields 54. Each data item has a corresponding data item version number 56.

The dataset version number 50, which reflects the highest version number 56 assigned to a data item 52, may be updated upon implementing a wireless device change list 28 (shown in FIG. 1), which revises the version number 56 of data items that have been changed. For example, if a wireless device change list 28 includes changes to three data items and the current network device dataset version number 50 is "16", implementation of the changes would result in the three data items 52 being assigned data item version numbers 56 of "17", "18" and "19" respectively and the network dataset version number would be updated to "19" (i.e., the highest version number 56 assigned to a data item 52 within the network device dataset 48).

The network device dataset 48 also may include a deletion indicator 82, which in one example, is referred to as a tombstone. The tombstone indicator 82 will be set to indicate that the associated data item 52 has been deleted from the data set. However, the deleted data item 52 will typically be maintained in the dataset 48, at least for a predetermined period of time, for the purpose of providing a means to recreate a prior version of the dataset at the network device if an application dictates such. Additionally, by providing a tombstone 82 that indicates that a data item 52 has been deleted, subsequent attempts to update or otherwise change the tombstoned data item 52 are ignored.

Figure 4:
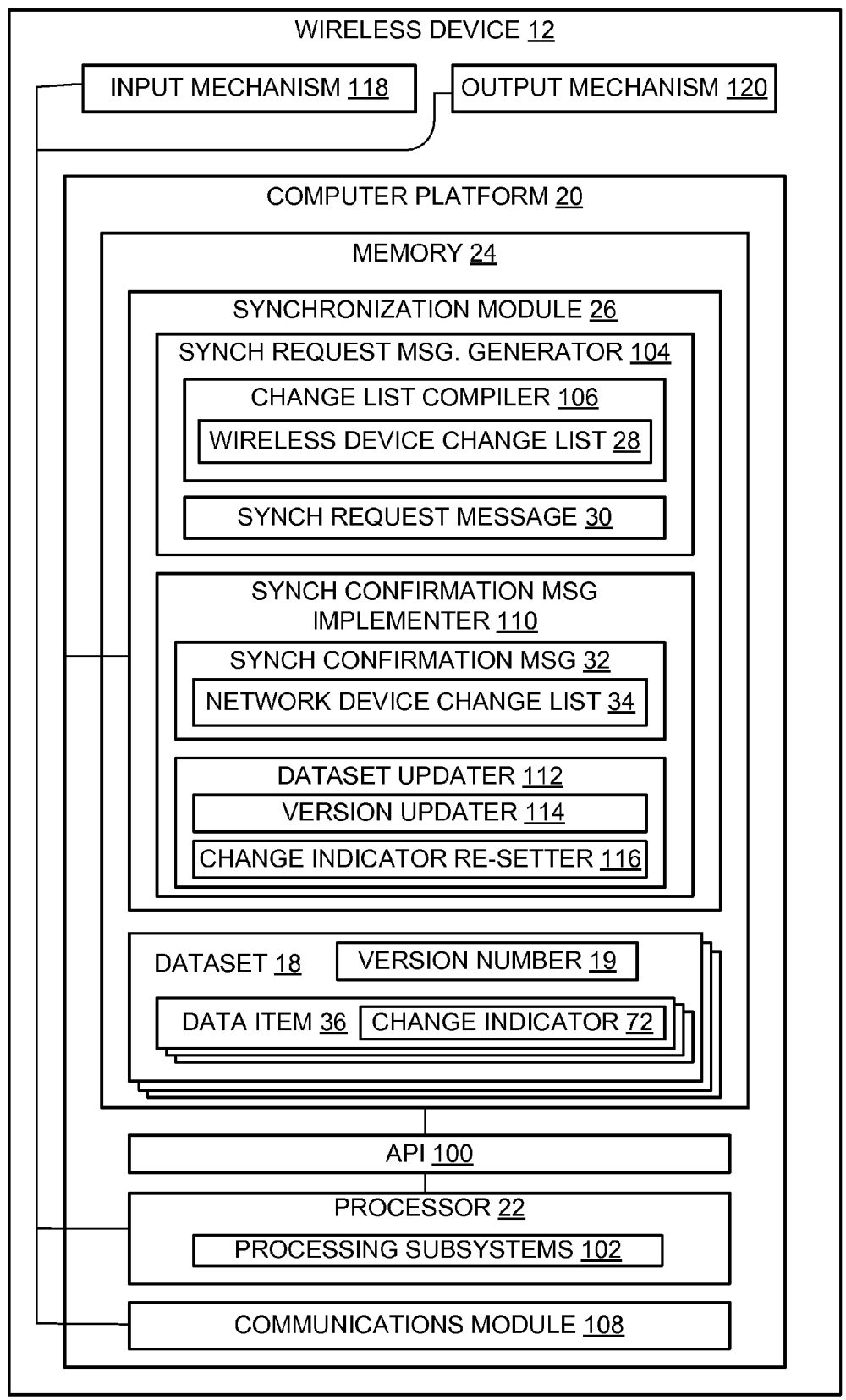
FIG. 4 is a block diagram of a wireless communication device configured for dataset synchronization, according to an aspect.

Referring to FIG. 4, according to one aspect, a detailed block diagram representation of wireless device 12 is depicted. The wireless device 12 may include any type of computerized, communication device, such as cellular telephone, Personal Digital Assistant (PDA), two-way text pager, portable computer, and even a separate computer platform that has a wireless communications portal, and which also may have a wired connection to a network or the Internet. The wireless communication device can be a remote-slave, or other device that does not have an end-user thereof but simply communicates data across the wireless network, such as remote sensors, diagnostic tools, data relays, and the like. The present apparatus and methods for dataset synchronization can accordingly be performed on any form of wireless communication device or wireless computer module, including a wireless communication portal, including without limitation, wireless modems, PCMCIA cards, access terminals, desktop computers or any combination or sub-combination thereof.

The wireless device 12 includes computer platform 20 that can transmit data across a wireless network, and that can receive and execute routines and applications. Computer platform 20 includes memory 24, which may comprise volatile and nonvolatile memory such as read-only and/or random-access memory (RAM and ROM), EPROM, EEPROM, flash cards, or any memory common to computer platforms. Further, memory 24 may include one or more flash memory cells, or may be any secondary or tertiary storage device, such as magnetic media, optical media, tape, or soft or hard disk.

Further, computer platform 20 also includes processor 22, which may be an application-specific integrated circuit ("ASIC"), or other chipset, processor, logic circuit, or other data processing device. Processor 22 or other processor such as ASIC may execute an application programming interface ("API") layer 100 that interfaces with any resident programs, such as synchronization module 26 stored in the memory 24 of the wireless device 12. API 100 is typically a runtime environment executing on the respective wireless device. One such runtime environment is Binary Runtime Environment for Wireless® (BREW®) software developed by QUALCOMM Incorporated, of San Diego, Calif. Other runtime environments may be utilized that, for example, operate to control the execution of applications on wireless computing devices.

Processor 22 includes various processing subsystems 102 embodied in hardware, firmware, software, and combinations thereof, that enable the functionality of communication device 12 and the operability of the communication device on a wireless network. For example, processing subsystems 100 allow for initiating and maintaining communications, and exchanging data, with other networked devices. In aspects in which the communication device is defined as a cellular telephone, the communications processor 22 may additionally include one or a combination of processing subsystems 100, such as: sound, non-volatile memory, file system, transmit, receive, searcher, layer 1, layer 2, layer 3, main control, remote procedure, handset, power management, digital signal processor, messaging, call manager, Bluetooth® system, Bluetooth® LPOS, position engine, user interface, sleep, data services, security, authentication, USIM/SIM, voice services, graphics, USB, multimedia such as MPEG, GPRS, etc (all of which are not individually depicted in FIG. 2 for the sake of clarity). For the disclosed aspects, processing subsystems 100 of processor 22 may include any subsystem components that interact with the synchronization module 26.

Computer platform 20 additionally includes communications module 108 embodied in hardware, firmware, software, and combinations thereof, that enables communications among the various components of the wireless communication device 12, as well as between the communication device 12 and wireless network 16. In described aspects, the communication module 108 enables the communication of all synchronization correspondence between wireless communication device 12 and the network device 14. The communication module 108 may include the requisite hardware, firmware, software, and/or combinations thereof for establishing a wireless network communication connection.

Additionally, wireless communication device 12 has input mechanism 118 for generating inputs into communication device, and output mechanism 120 for generating information for consumption by the user of the communication device. For example, input mechanism 102 may include a mechanism such as a key or keyboard, a mouse, a touch-screen display, a microphone, etc. In certain aspects, the input mechanisms 118 provide for user input to initiate the synchronization process. Further, for example, output mechanism 120 may include a display, an audio speaker, a haptic feedback mechanism, etc. In the illustrated aspects, the output mechanism 104 may include a display operable to display message indicating that synchronization is initiated, in progress, successfully completed, and/or failed or the like.

The memory 24 of computer platform 20 includes a synchronization module 26 operable to synchronize datasets 18. The synchronization module 26 may be initiated by a predetermined user action, a predetermined device action and/or at predetermined times. The user action may include engaging a predetermined user interface, such as a designated keypad or button on the wireless device. The predetermined device action may include activation of the wireless network signal, such that synchronization occurs whenever the device is triggered to an on-line mode to accommodate changes made to a dataset during off-line mode.

The synchronization module 26 may rely on a lightweight data-interchange protocol as the carrier protocol in order to limit the synchronization process to a single round-trip of wireless communication between the wireless device 12 and the network device 14. A lightweight data-interchange protocol may characteristically be built on two structures, a collection of name/pair values, and an ordered list of values. The name/value pairs may include an object, a record, a structure, a dictionary, a hash table, a keyed list, an associative array, or the like. The ordered list of values may include an array, a vector, a list, a sequence, or the list. One example of a lightweight data-interchange protocol is JavaScript™ Object Notation (JSON). In JSON an object is an unordered set of name/value pairs, an array is an ordered collection of values and a value can be a string, a number, a true/false/null indicator, an object or an array.

The synchronization module 26 includes synchronization request message generator 104 that is operable to generate and communicate a synchronization request message 30. The synchronization request message includes the current dataset version number 19 and, if any changes have occurred to the dataset 18 since the prior synchronization session, a wireless device change list 28. As such, the synchronization request message generator 104 includes change list compiler 106 operable to compile a change list 28 of data items 36 in a dataset 18 that have been changed since the prior synchronization session. In this regard, the compiler 106 checks the change indicator 72, such as a dirty bit or the like, to verify if a change has occurred. If the change indicator 72 indicates a change, the data item is added to the change list 28. As previously noted, in some aspects, the synchronization process refers to data items 36, as opposed to subsets of a data item, referred to as data fields 38 (as shown in FIG. 1). Therefore, the entire data item 36 that is changed is included in the change list 28. It should be noted, however, that in some aspects only the respective data field 38 and a reference to the corresponding data item 36 might be included in the change list 28.

As previously noted the change indicator 72 may indicate an added data item, an insertion to a data item, a deletion to a data item, a change to a data item or a deleted data item. In order to insure proper incorporation of the change at the network device 14, the change indicator 72 may distinguish between an added or changed data item and a deleted data item. For example, added or changed data items may be assigned a bit value of "1" and a deleted data item may be assigned a value of "2."

Once the synchronization request message generator 104 has generated the synchronization request message 30, the wireless device 12 implements communication module 108 to facilitate wireless communication of the synchronization request message 30. Communication of the synchronization request message forms the first leg of the single round-trip of communication needed to complete the synchronization process, according to present aspects.

The synchronization module 26 additionally includes synchronization confirmation message implementer 110 operable for receiving the synchronization confirmation message 32 from the network device 14 and processing the message accordingly. The synchronization confirmation message 32 forms the second leg of the single round-trip of communication needed to complete the synchronization process. In some aspects, the synchronization confirmation message 32 may include a synchronization status indicator, which indicates whether the synchronization was successful at the network device level and the network device dataset version number 50 (shown in FIG. 1). In other aspects, the synchronization confirmation message 32 in and of itself comprises an indicator of a successful sync session.

In some applications, synchronization confirmation message 32 may include a network device change list 34 corresponding to data items 52 (shown in FIG. 1) in the corresponding network device dataset 48 (shown in FIG. 1) that have been changed and require incorporation into the wireless device dataset 18. As such, synchronization confirmation message implementer 110 includes dataset updater 112 operable for making changes to the data items 36 in the dataset 19 according to the received network device change list 34. Additionally, dataset updater 112 includes version updater 116 operable for updating the version number 19 of the wireless device dataset 18 to reflect the current network device version number 50 as indicated in the synchronization confirmation message 32. The dataset updater 112 includes change indicator re-setter 116 operable to re-set all of the change indicators 72 to indicate a "no change" state upon notification of successful completion of the synchronization process.

Figure 5:
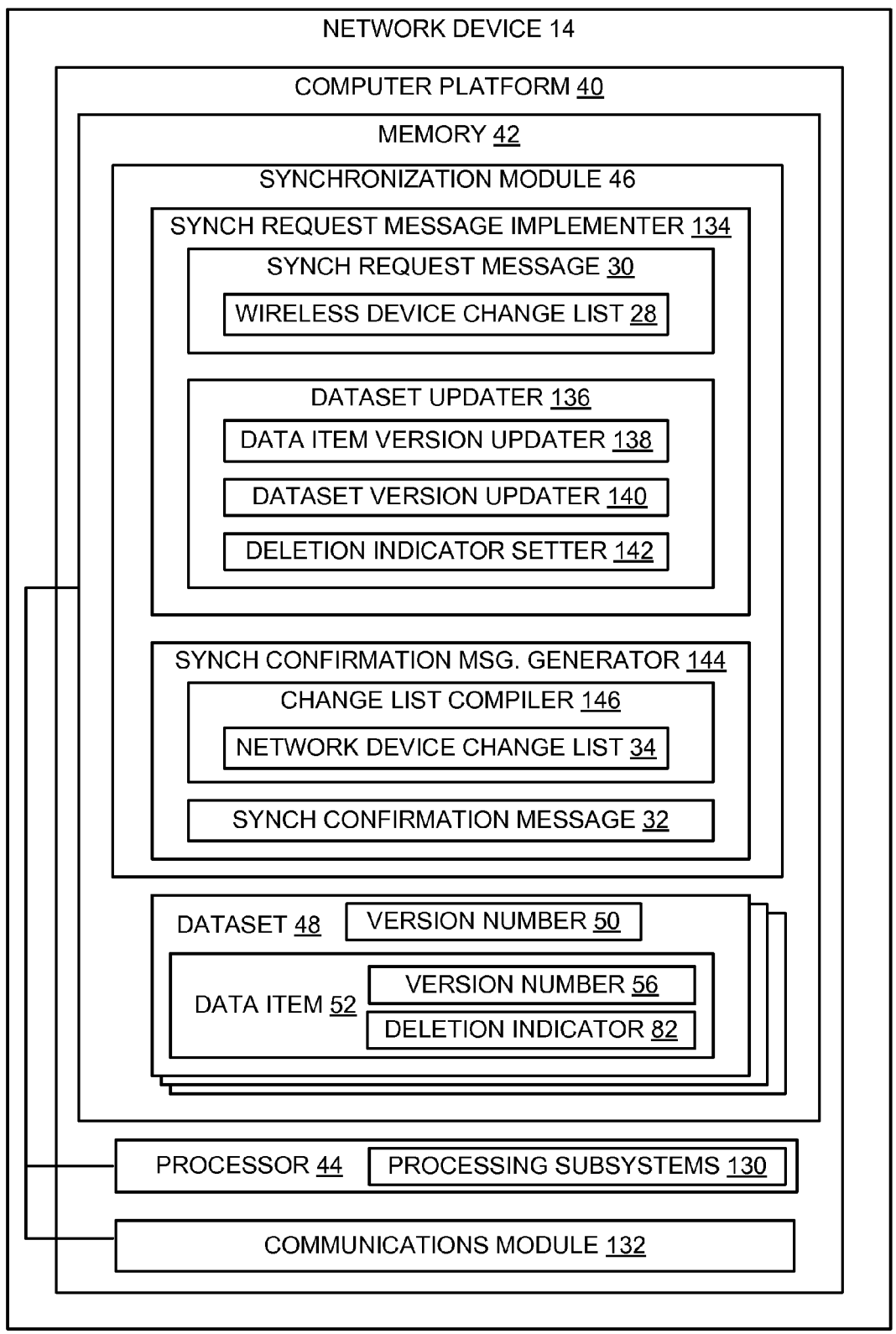
FIG. 5 is a block diagram of a network device configured for dataset synchronization, according to an aspect.

Referring to FIG. 5, according to another aspect, a block diagram is illustrated of a network device 14, which is operable for synchronizing datasets. The network device 14 may comprise at least one of any type of hardware, server, personal computer, mini computer, mainframe computer, or any computing device either special purpose or general computing device. Further, the modules and applications described herein as being operated on or executed by the network device 14 may be executed entirely on the network device 14 or alternatively, in other aspects, separate servers, databases or computer devices may work in concert to provide data in usable formats to parties, and/or to provide a separate layer of control in the data flow between the wireless device 12 and the modules and applications executed by network device 14.

The network device 14 includes computer platform 40 that can transmit and receive data across wireless network 16 (shown in FIG. 1), and that can execute routines and applications. Computer platform 40 includes a memory 42, which may comprise volatile and nonvolatile memory such as read-only and/or random-access memory (RAM and ROM), EPROM, EEPROM, flash cards, or any memory common to computer platforms. Further, memory 42 may include one or more flash memory cells, or may be any secondary or tertiary storage device, such as magnetic media, optical media, tape, or soft or hard disk.

Further, computer platform 40 also includes a processor 44, which may be an application-specific integrated circuit ("ASIC"), or other chipset, logic circuit, or other data processing device. Processor 44 includes various processing subsystems 130 embodied in hardware, firmware, software, and combinations thereof, that enable the functionality of network device 14 and the operability of the network device on a wireless network. For example, processing subsystems 130 allow for initiating and maintaining communications, and exchanging data, with other networked devices. For the disclosed aspects, processing subsystems 130 of processor 44 may include any subsystem components that interact with the synchronization module 46.

The computer platform 40 further includes a communications module 132 embodied in hardware, firmware, software, and combinations thereof, that enables communications among the various components of network device 14, as well as between the network device 14 and wireless communication devices 12. The communication module 132 may include the requisite hardware, firmware, software, and/or combinations thereof for establishing a wireless communication connection. The communication module 132 is operable to receive synchronization request messages 30 communicated across wireless network 16 and communicate synchronization confirmation messages 32 across wireless network 16.

The memory 42 of network device 14 includes synchronization module 46 operable to receive and process synchronization request messages 30 and, in response to the request messages 30, generate and communicate synchronization confirmation messages 32. As such, the synchronization module 46 includes synchronization request message implementer 134 operable to receive the request message 30 and process the message accordingly. If the wireless device dataset 18 (shown in FIGS. 1 and 4) has undergone data item 36 (shown in FIGS. 1 and 4) changes since the previous synchronization session, synchronization request message 30 will include a wireless device change list 28 that includes the data items that have been changed.

The synchronization request message implementer 134 additionally includes a dataset updater 136 that is operable to update the corresponding dataset 48 on the network device in accordance with the wireless device change list 28. As such, the dataset updater 136 will change data items 52, such as adding to a data item, deleting from a data item, changing a data item, adding a data item, or deleting a data item, according to the changed data items in the wireless device change list 28. The dataset updater 136 includes a data item version updater 138 operable for updating the version number 56 of the data item 52 based on a change to the data item. Each data item 52 is assigned a version number 56 and any change to a data item 52 will dictate a new version number 56. Version numbers 56 are assigned sequentially starting from the next number after the current network device dataset version number 50. For example, if the current dataset version number 50 is "20" and the wireless device change list 28 includes changes to four data items, the data items 52 will be assigned updated version numbers 56 of "21," "22", "23" and "24." The dataset updater 136 additionally includes dataset version updater 140 operable for updating the version number 50 of the network device dataset 48 based on a change to any data item 52 in the dataset 48. In one example, the dataset version number 48 is equivalent to the highest data item version number 56. Thus, in the example previously presented, in which four data items 52 were changed and updated version numbers 56 of "21", "22", "23" and "24" were assigned, the network device dataset version number 50 is updated from "20" to "24".

Additionally, the dataset updater 136 will include a deletion indicator setter 142 operable for setting a deletion indicator 82, otherwise referred to as a tombstone, for any data item 52 that has been deleted from the dataset 48. In this regard, a data item 52 being deleted is assigned an updated version number 56 and the deletion indicator 82 is set. The deletion indicator 82 provides for deleted items 52 to be marked as deleted but otherwise maintained within the dataset 48. By maintaining deleted data items 52 in the dataset 48, the network device can recreate a prior version of the dataset if a synchronization session warrants such and prevent future attempts to update the respective tombstoned data item 52.

The synchronization module 46 additionally includes synchronization confirmation message generator 144 operable to generate a synchronization confirmation message 32, which includes the synchronization status indicator (e.g., synchronization successful, synchronization failure, etc.) and the updated and/or current version number 50 of the network device dataset 48. The synchronization confirmation message 32 may additionally include a network device change list 34 if the network device dataset 48 has undergone data item 52 changes since the previous synchronization session with the requesting wireless device 12. As such, the synchronization confirmation message generator 144 includes change list compiler 146 for compiling a network device change list 34. The network device change list 34 will include data items 52 having version numbers 56 greater than the version number 19 of the wireless device 12 indicated in the synchronization request message 30 and less than or equal to the version number 50 of the network device dataset 48 prior to the updating of the network device dataset 48 (i.e. the version number 50 of the network device dataset 48 upon receipt of the synchronization request message 30).

Upon generation of the synchronization confirmation message 32, the message is communicated to the requesting wireless device 12 via communications module 132. Similar to the synchronization request message 30, the synchronization confirmation message 32 may be communicated via a lightweight data-interchange carrier protocol, such as JavaScript Object Notation (JSON) protocol.

Figure 6:
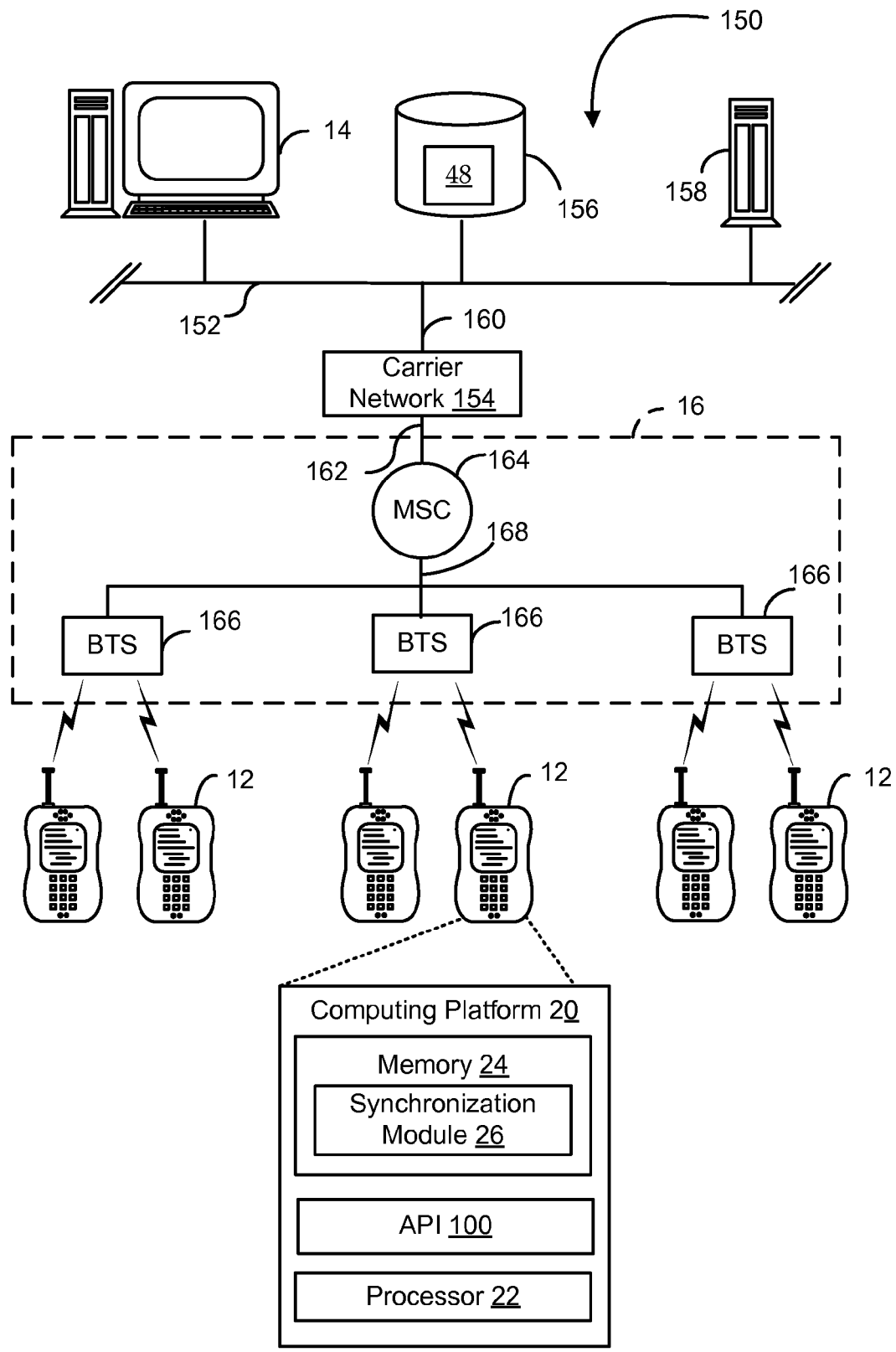
FIG. 6 is a block diagram of a wireless communication network, according to an aspect.

FIG. 6 represents a block diagram of a cellular network. Wireless network 16 may comprise a cellular network and, as such may be implemented to communicate synchronization request messages 30 to the network device 14 and receive synchronization confirmation messages 32 from the network device 14. Referring to FIG. 6, in one aspect, wireless device 12 includes a wireless communication device, such as a cellular telephone. In present aspects, wireless communication devices are configured to communicate via the cellular network 150. The cellular network 150 provides wireless communication device 12 the capability to communicate synchronization requests message 30 to the network device 14 and receive synchronization confirmation messages 32 from the network device 14, respectively. The cellular telephone network 150 may include wireless network 16 connected to a wired network 152 via a carrier network 154. FIG. 6 is a representative diagram that more fully illustrates the components of a wireless communication network and the interrelation of the elements of one aspect of the present system. Cellular telephone network 150 is merely exemplary and can include any system whereby remote modules, such as wireless communication devices 12 communicate over-the-air between and among each other and/or between and among components of a wireless network 16, including, without limitation, wireless network carriers and/or servers.

In network 150, network device 14, such as a network server, can be in communication over a wired network 152 (e.g. a local area network, LAN) with a separate network database 156 for storing the datasets 48. Further, a data management server 158 may be in communication with network device 14 to provide post-processing capabilities, data flow control, etc. Network device 14, network database 156 and data management server 158 may be present on the cellular telephone network 150 with any other network components that are needed to provide cellular telecommunication services. Network device 14, and/or data management server 158 communicate with carrier network 154 through a data links 160 and 162, which may be data links such as the Internet, a secure LAN, WAN, or other network. Carrier network 154 controls messages (generally being data packets) sent to a mobile switching center ("MSC") 164. Further, carrier network 154 communicates with MSC 164 by a network 162, such as the Internet, and/or POTS ("plain old telephone service"). Typically, in network 162, a network or Internet portion transfers data, and the POTS portion transfers voice information. MSC 164 may be connected to multiple base stations ("BTS") 166 by another network 168, such as a data network and/or Internet portion for data transfer and a POTS portion for voice information. BTS 166 ultimately broadcasts messages wirelessly to the wireless communication devices 12 by any acceptable over-the-air methods.

Figure 7:
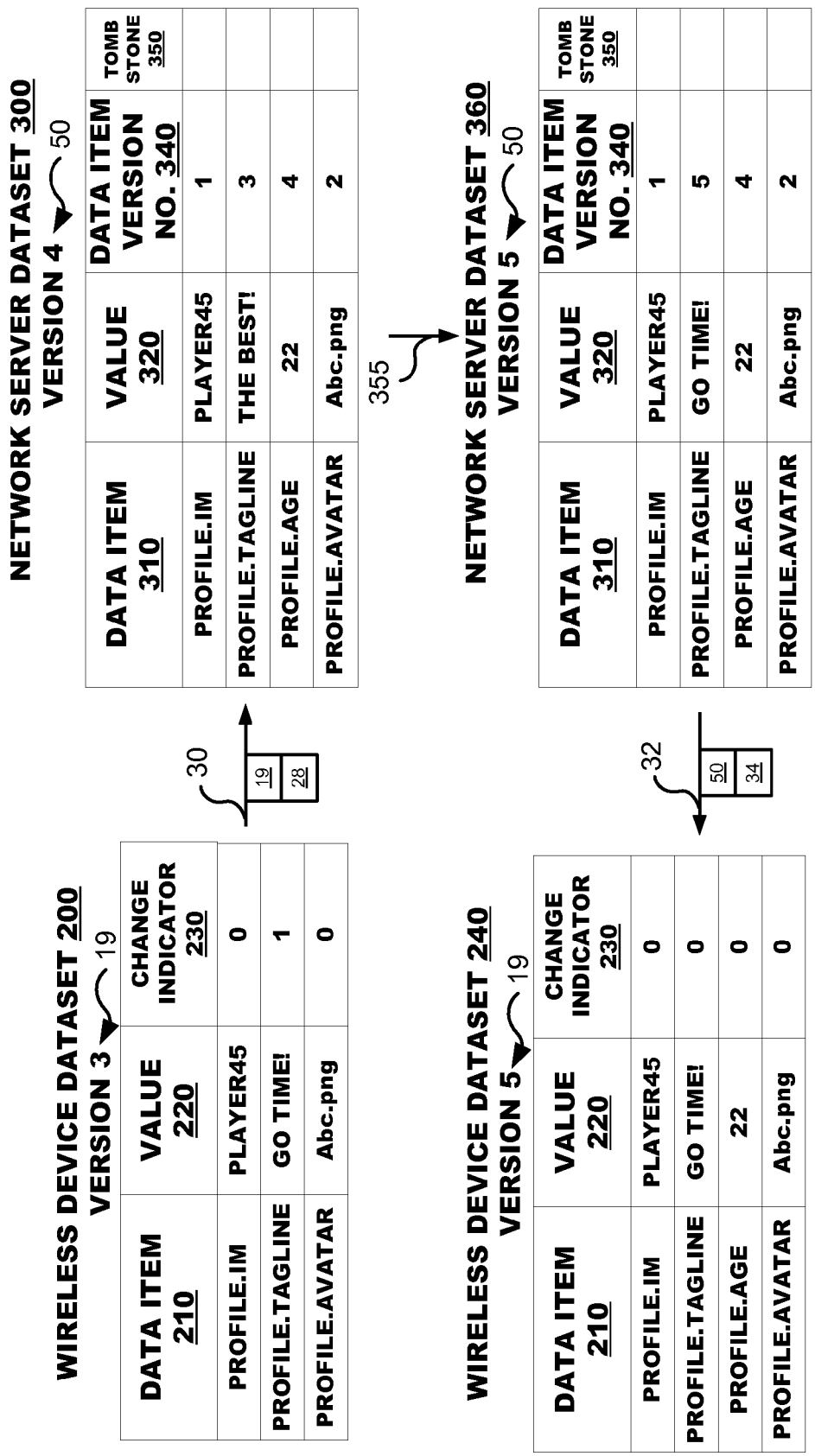
FIG. 7 is an example of dataset synchronization, according to an aspect.
Figure 8:
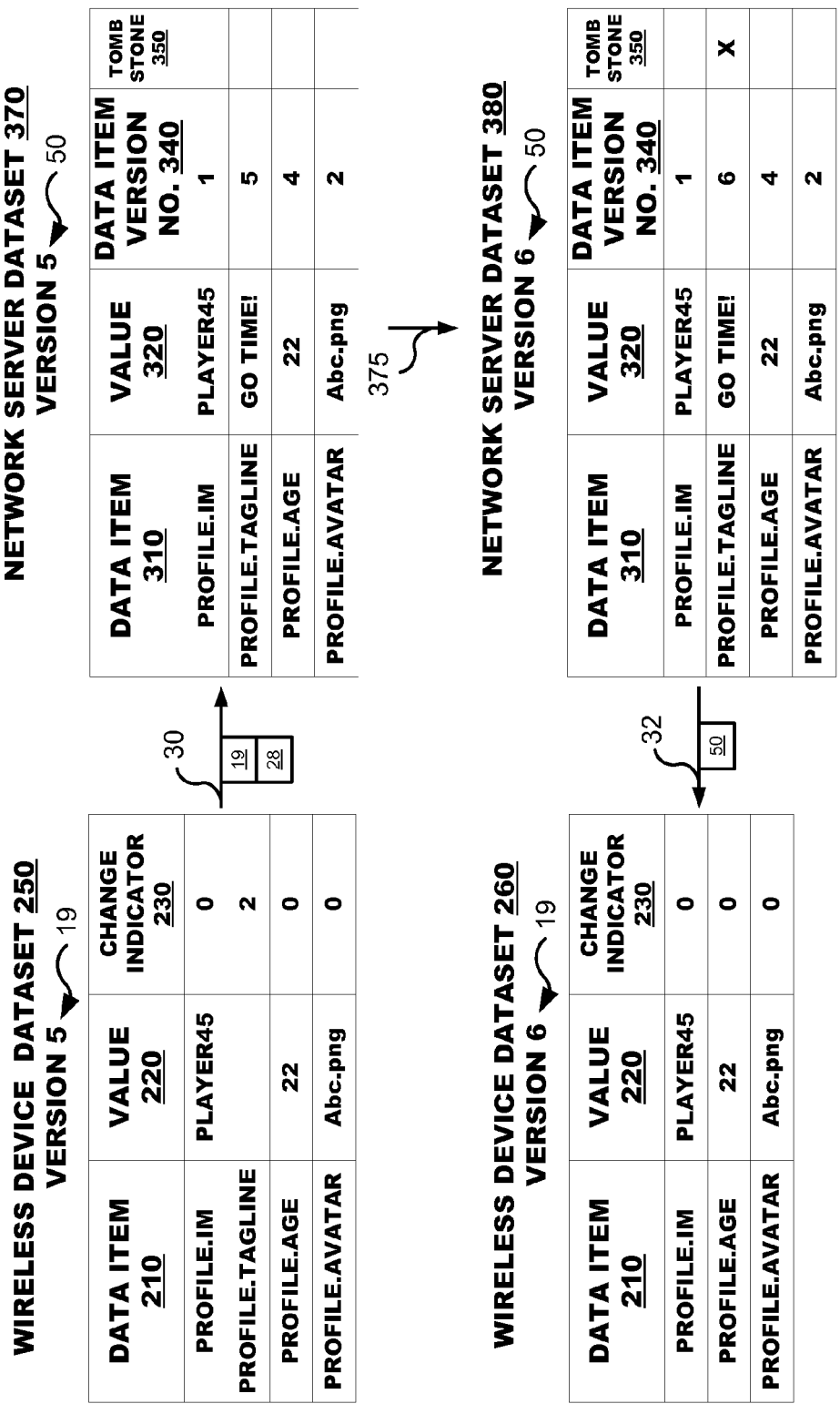
FIG. 8 is another example of dataset synchronization, according to another aspect.

FIGS. 7 and 8 provide examples of dataset synchronization, according to present aspects. Referring to FIG. 7 prior to a synchronization session, wireless device dataset 200 is at version "3" and the corresponding network server dataset 300 is at version "4." Version "3" of wireless device dataset 200 includes three data items 210, entitled "profile.im," "profile.tagline" and "profile avatar." Each data item 210 has a corresponding value 220; the "profile.im" value is "PLAYER45," the "profile.tagline" value is "GO TIME!" and the "profile.avatar" value is "Abc.png." Each data item 210 has a corresponding change indicator field 230. The change indicator field 230 indicates that the data items 210 entitled, "profile.im" and "profile.avatar" have not undergone any changes since the previous synchronization session, and that the data item 210 entitled "profile.tagline" has undergone a change since the previous synchronization session.

Version "4" of network server dataset 300 includes four data items 310, entitled "profile.im," "profile.tagline", "profile.age" and "profile avatar." Each data item 310 has a corresponding value 320; the "profile.im" value is "PLAYER45," the "profile.tagline" value is "THE BEST!" the "profile.age" value is "22" and the "profile.avatar" value is "Abc.png." Each data item 310 has a corresponding version number 340: "profile.im" is at version "1," "profile.tagline" is at version "3", "profile.age" is at version "4" and "profile avatar" is at version "2." Further, each data item 310 may have a corresponding deletion indicator 350, otherwise referred to as a tombstone, to indicate that the respective data item has been deleted from the respective dataset. In dataset 300, none of the data items 310 has been deleted and, thus, no tombstones are set to indicate deletion.

Synchronization between the wireless device dataset 200 and the network server dataset 300 ensues based on synchronization request message 30. In particular, wireless device 12 generates and sends synchronization request message 30 to network device 14. If applicable, the wireless device 12 compiles a change list 28, which in this case includes the data item "profile.tagline" and the corresponding value "GO TIME!" based on change indicator 230 having a value of "1". As such, in this case, the wireless device change list 28 and the current wireless device dataset version 19, i.e. version "3," are included in the synchronization request message 30 that is communicated to the network server 14. In turn, at event 355, the network service 14 receives the synchronization request message 30 and, if applicable, implements the changes in the change list 28, updates the corresponding changed data item version numbers 340, and updates the network server dataset version number 50.

Network server dataset 360 depicts the dataset after the changes in the wireless device change list have been implemented, the data item version numbers have been revised, and the network server dataset version number has been revised. Specifically, data item 310, entitled, "profile.tagline" has been changed to reflect a value of "GO TIME!" based on wireless device change list 28. Further, the data item version number 340 for the data item 310 entitled "profile.tagline" has been updated from version "3" to version "5," and network server dataset version number 50 has been updated from version "4" to version "5," where version "5" corresponds to the highest sequenced data item version 340.

Additionally, in response to the receipt of synchronization request message 30, the network server 14 generates and sends synchronization confirmation message 32 to the requesting wireless device 12. Synchronization confirmation message 32 includes the latest wireless device dataset version 50, and, if applicable, may include network device change list 34 to synchronize the requesting wireless device with the latest version of the respective dataset. In this case, for example, once the wireless device changes have been implemented at the network server, the network server compiles a network server change list 34 for inclusion with synchronization confirmation message 32, and communicates the confirmation message to the wireless device. The network device change list 34 includes all data items having version numbers greater than the received wireless device dataset version number up to the current version number of the network server dataset, minus any changes caused by the wireless device change list 28, e.g. the delta between the latest network device dataset version and the current wireless device dataset version. Thus, in the example of FIG. 7, the network server change list 34 includes the data item 310, entitled "profile.age" having a value of "22", since the corresponding data item version number is "4", which is greater than the wireless device version number, "3", but does not include value "GO TIME!" of data item 310 entitled "profile.tagline" as this data item version was based on wireless device change list 28. Further, in some aspects, the synchronization confirmation message 32 may include a synchronization status indicator. Thus, in the illustrated example, the synchronization confirmation message includes a network server dataset version number of "5," network device change list 34, and may include a "synchronization successful" indicator.

Wireless device dataset 240 depicts the dataset after the synchronization confirmation message 32 has been received, the network device change list 34 has been implemented, and wireless device version number 19 has been revised. Specifically, data item 210 entitled, "profile.age" having a value of "22" has been added to dataset 240 and the dataset version number 19 has been updated from "3" to "5."

Referring to FIG. 8, continuing with the prior example, based on operation of an application using wireless device dataset 250, the value 220 corresponding to data item 210 entitled "profile.tagline" has been cleared or deleted. As such, prior to a synchronization session, wireless device dataset 250 has version 19 with a value of "5" and the corresponding network server dataset 360 has version 50 with a value of "5." Version "5" of wireless device dataset 250 includes four data items 210, entitled "profile.im," "profile.tagline", "profile.age" and "profile avatar." Each data item 210 has a corresponding value 220: the "profile.im" value is "PLAYER45," the "profile.tagline" value is null or deleted, the "profile.age" value is "22," and the "profile.avatar" value is "Abc.png." Each data item 210 has a corresponding change indicator field 230. The change indicator field 230 indicates that the data items 210 entitled, "profile.im" "profile.age" and "profile.avatar" have not undergone change since the previous synchronization session, and that the data item 210 entitled "profile.tagline" has been deleted since the previous synchronization session. In this case, deletion of the data item 210 is indicated by setting the bit corresponding to change indicator 230 to "2."

Version "5" of network device dataset 370 includes four data items 310, entitled "profile.im," "profile.tagline", "profile.age" and "profile.avatar." Each data item 310 has a corresponding value 320: the "profile.im" value is "PLAYER45," the "profile.tagline" value is "Go TIME!" the "profile.age" value is "22" and the "profile.avatar" value is "Abc.png." Further, each data item 310 has a corresponding version number 340: "profile.im" is at version "1," "profile.tagline" is at version "5", "profile.age" is at version "4" and "profile avatar" is at version "2". Additionally, each data item 310 may have a corresponding deletion indicator, otherwise referred to as a tombstone 350, to indicate that the respective data item that has been deleted from the dataset. For network device dataset 370, none of the data items 310 has been deleted and, thus, no tombstones 350 are set to indicate deletion.

Synchronization between the wireless device dataset 250 and the network server dataset 370 ensues based on synchronization request message 30 generated by the respective wireless device 12 and sent to the respective network device 14. In this case, the wireless device compiles wireless device change list 28 that includes the data item "profile.tagline" and the value of "2" for the corresponding change indicator 230, thereby representing a deletion of the respective data item from the wireless device dataset 250.

The wireless device change list 28 and the current value of the wireless device dataset version 19, e.g. version "5" in this case, are included in the synchronization request message 30 that is communicated to the network device 14 having the corresponding network device dataset. In turn, the network device receives the synchronization request message 30, and at event 375, implements the changes in the wireless device change list 28, updates the respective changed data item version numbers 340, and updates the network server dataset version number 50.

Network server dataset 380 depicts the dataset after the changes in the wireless device change list 30 have been implemented, the data item version numbers have been revised, and the network server dataset version number has been revised. Specifically, data item 310, entitled, "profile.tagline" has tombstone indicator 350 updated with a value, and "X" in this instance, which designates that the respective data item has been deleted from the network device dataset. Further, the data item version number 340 for the data item 310 entitled, "profile tagline" has been updated from version "5" to version "6" to reflect the change to the data item, and network server dataset version number has been updated from version "5" to version "6," where version "6" is the highest sequenced data item version 340.

Once the changes have been implemented, the network server generates a synchronization confirmation message 32 and communicates the confirmation message to the wireless device. Since no changes occurred in the network device dataset 380 since the previous synchronization session, no network server change list 34 is compiled and thus network server change list 34 is not included in the synchronization confirmation message. As such, in the example of FIG. 8, the synchronization confirmation message 32 includes the updated network server dataset version number 50. Thus, in the illustrated example, the synchronization confirmation message 32 includes a network server dataset version number of "6."

Wireless device dataset 260 depicts the dataset after the synchronization confirmation message 32 has been received and wireless device version number 19 has been revised. In this case, since the prior version of the wireless device dataset indicated that a data item was deleted, upon receiving the synchronization confirmation message 32, the wireless device 12 is able to delete the respective data item from the wireless device dataset. Specifically, data item 210 entitled "profile.tagline" has been deleted from the wireless device dataset 260 and the dataset version number 19 has been updated from "5" to "6."

It should be noted that other methods might be utilized to delete data items from the wireless device dataset. For example, since the deletion of a data item may be considered a serious type of update or change, the system may allow the network device to confirm the deletion, such as by including the tombstone indicator 350 in the network device change list 32 to confirm to the wireless device that it is appropriate to delete the respective data item from the wireless device dataset.

Figure 9:
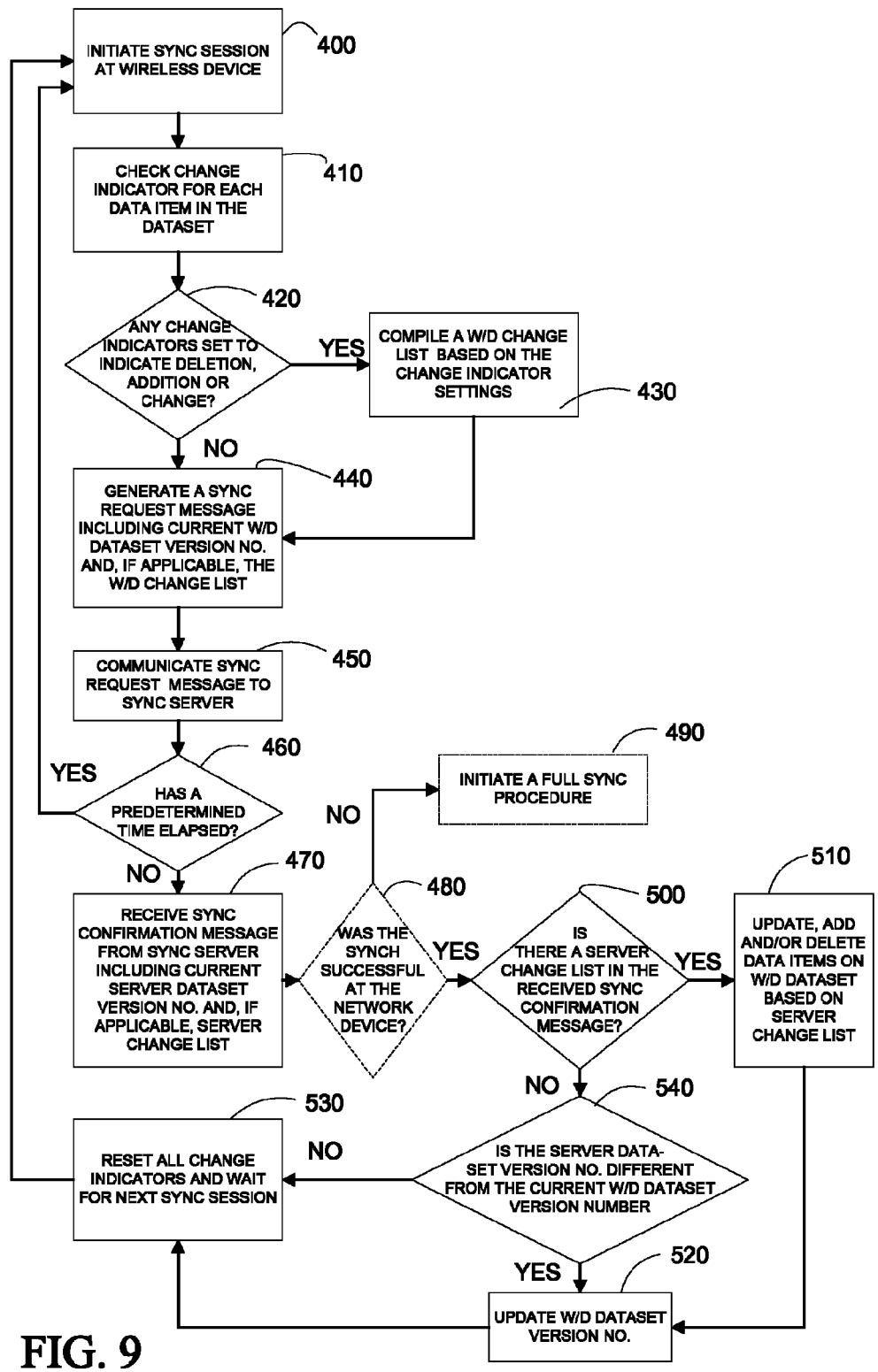
FIG. 9 is a flow diagram of a method for dataset synchronization on a wireless communication device, according to an aspect.

Referring to FIG. 9, a flow diagram of a method for dataset synchronization at a wireless device is depicted. At Event 400, the synchronization session is initiated at a wireless device. Initiation of the synchronization session may be accomplished by a predetermined user action, such as engaging a predetermined keypad, a predetermined event, such as triggering an on-line mode, a predetermined time, and/or the like. At Event 410, the synchronization module checks the change indicator for each data item in the dataset and, at Event 420, a determination is made as to whether any of the change indicators have been set to indicate a change to a data item, addition of a data item or deletion of a data item.

If it is determined that one or more of the change indicators have been set to indicate a change to a data item, at Event 430, a wireless device change is complied based on the change indicator settings. For example, change indicators that indicate a change to a data item or the addition of a data item will require incorporation of changed or added data item in the compiled change list. In addition, change indicators that indicate the deletion of a data item will require identification of the data item and a deletion indicator in the change in the compiled change list.

At Event 440, a synchronization request message is generated that includes the current wireless device dataset version number and, if applicable, the wireless device change list. At Event 450, the synchronization request message is communicated to a network device. In some aspects, the synchronization request message is communicated via a lightweight data-interchange carrier protocol, such as JavaScript Object Notation (JSON) protocol or the like.

At Event 460, the wireless device determines whether a predetermined time has elapsed. The predetermined time is typically defined to provide for an allowable time to receive a synchronization confirmation message. If the predetermined time has elapsed, the session assumes that the communication that included the synchronization request message failed or the communication that includes the synchronization confirmation message has failed. If the predetermined time has elapsed, the method returns to Event 400 and a new synchronization session is initiated. As such, present aspects allow for a robust synchronization method, whereby a communication failure provides for a new "soft" synchronization session to be initiated without the need to perform a "full" synchronization procedure (i.e., exchange and replacement of the entire dataset stored at the wireless device or the network device). It should be noted, however, that a "full" synchronization may be implemented, for example, after a predetermined number of "soft" sync failures and/or based on receiving an error message from the network device, as noted below.

At Event 470, if the predetermined time has not elapsed, meaning the synchronization session is still within allowable time limit, the wireless device receives the synchronization confirmation message from the network device, otherwise referred to as the synch/synchronization server. The synchronization confirmation message includes the current network device dataset version number, the synchronization status indicator, and any applicable network device change list. Optionally, at Event 480, the synchronization status indicator is checked to determine if the synchronization was successfully performed at the network device. If the synchronization was unsuccessful, at Event 490, the wireless device initiates a "full" synchronization procedure. In one aspect, full synchronization requires the wireless device to communicate the entire dataset to the network device for full synchronization.

If the synchronization status indicator indicates that synchronization was successful at the network device, at Event 500, the wireless device determines if the synchronization confirmation message includes a network device change list. If a change list is included in the confirmation message, at Event 510, the appropriate changes are implemented to the dataset, including changes to data items, adding data items and/or deleting data items from the dataset. Once the changes to the dataset have been implemented, at Event 520, the wireless device dataset version number is update to reflect the version number of the network device dataset, as indicated in the confirmation message. At Event 530, all data item change indicators are re-set to indicate "no change" and the wireless device waits until a new sync session is initiated at Event 400.

If, at Event 500, the wireless device determines that no change list is included in the synchronization confirmation message then, at Event 540, a determination is made as to whether the current wireless device dataset version number is different from the network device dataset revision number, as indicated in the confirmation message. If the dataset version numbers are different then, at Event 520, the wireless device dataset version number is update to reflect the version number of the network device dataset, as indicated in the confirmation message and, at Event 530, all data item change indicators are re-set to indicate "no change" and the wireless device waits until a new sync session is initiated at Event 400. If the dataset version numbers are not different then, at Event 530, all data item change indicators are re-set to indicate "no change" and the wireless device waits until a new sync session is initiated at Event 400.

Figure 10:
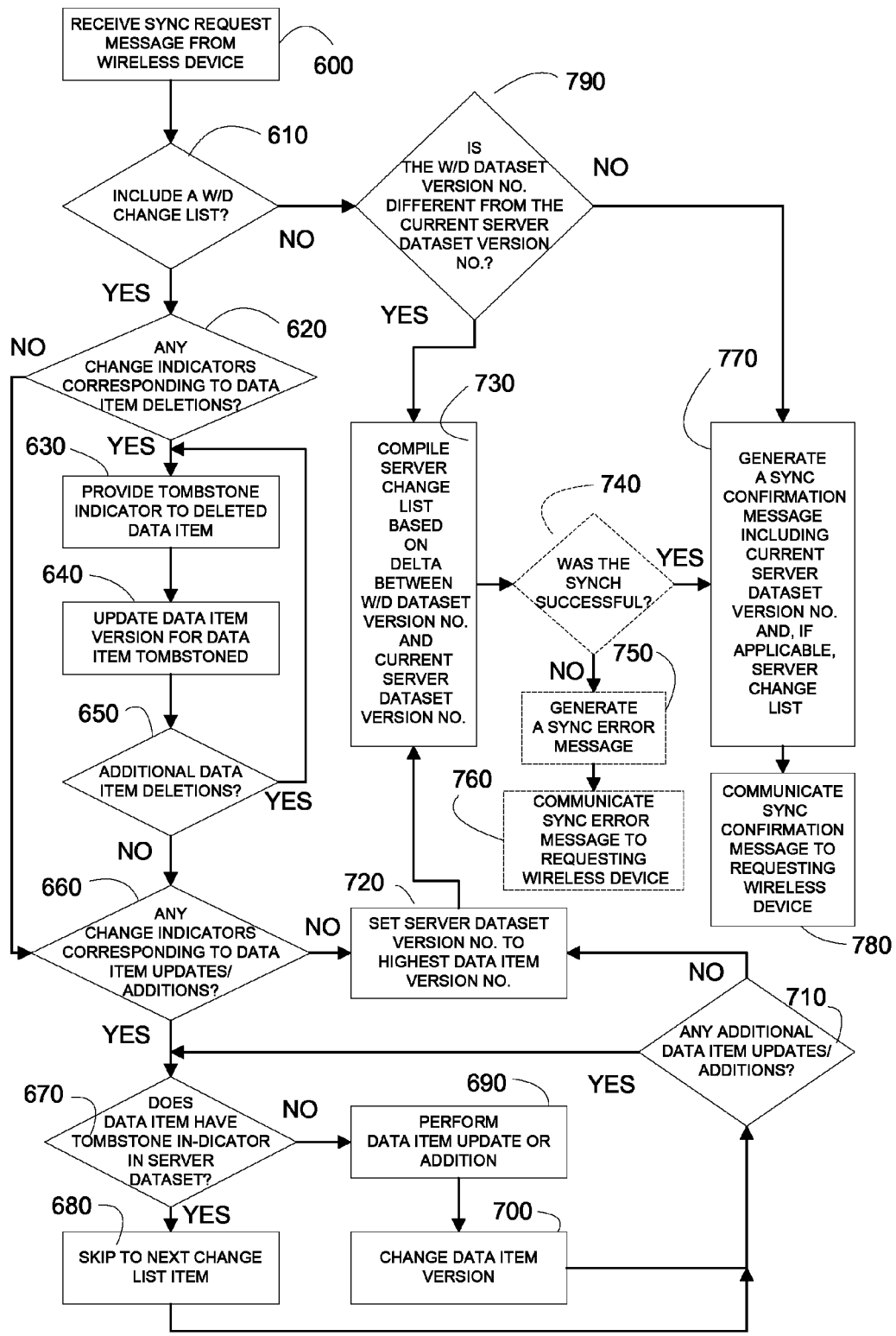
FIG. 10 is a flow diagram of a method for dataset synchronization on a network device, according to an aspect.

Referring to FIG. 10, a flow diagram of a method for dataset synchronization at a network device is depicted. At Event 600, the network device receives a synchronization request message from a wireless device. At Event 610, a determination is made as to whether the request message includes a wireless device change list. If a change list is included in the request message then at Event 620, a determination is made as to whether any changes in the list correspond to data item deletions. If changes correspond to deletions, at Event 630, a tombstone/deletion indicator is set for the deleted data item and, at Event 640, the data item version number for the deleted item is updated. The updated data item version number reflects the next sequenced number after the highest data item version number.

At Event 650, a determination is made as to whether additional data item deletions are provided for in the change list. If additional deletions are included in the change list, the process returns to Event 630 and a tombstone/deletion indicator is provided for the additional deleted data item and, at Event 640, the data item version number for the deleted item is updated. If, at Event 650, a determination is made that no additional deletions are included in the change list, at Event 660, a determination is made as whether any changes in the list correspond to data item changes and/or data item additions.

If changes correspond to additions/changes, at Event 670, a determination is made as to whether the data item that is being changed has a tombstone/deletion indicator in the network device dataset, thereby indicating that no further updates can be made to the respective data item. If the data item that is being changed has a tombstone/deletion indicator then, at Event 680, the process forwards to Event 710 to determine if there are any remaining items in the change list having updates/additions, which then returns to Event 670, as described above. If the data item that is being changed does not have a tombstone/deletion indicator then, at Event 690, the applicable data item change is made by replacing the data item in the current network device dataset with the data item in the change list or the applicable data item addition is made to the dataset. At Event 700, the data item version number for the changed or added data items is updated. The updated data item version number reflects the next sequenced number after the highest data item version number.

At event 710, a determination is made as whether any additional data items changes or additions remain in the change list. If additional changes/additions exist in the change list, the process returns to Event 670. If no additional changes/additions exist in the change list then, at Event 720, the network device dataset version number is set to the highest data item version number. Additionally, at Event 660, if the change list does not include any changes/additions then, at Event 720, the network device dataset version number is set to the highest data item version number.

At Event 730, the wireless device compiles a network device change list of data items that have a version number greater then the version number of the wireless device, as indicated in the request message and up to the network device dataset version number just prior to receiving the request message.

Optionally, at Event 740, a determination is made as to whether the synchronization process was successful. In one instance, an unsuccessful synchronization process may be the result of various reasons, including, but not limited to, a database failure at the network device, purging of tombstoned items to create memory space or any other reason that may require the wireless device to perform a full synchronization, such as the wireless device not having connected to the wireless network for a long period of time. If the synchronization is not successful, at Event 750, a synchronization error message is generated and, at Event 760, the synchronization error message is communicated to the requesting wireless device.

If the synchronization process is determined to be successful, at Event 770, a synchronization confirmation message is generated that includes the current network device dataset version number, a synchronization status indicator and, if applicable a network device change list. At Event 780, the synchronization confirmation message is communicated to the requesting wireless device.

If at Event 610, a determination is made that the synchronization request message does not include a wireless device change list then, at Event 790, a determination is made as to whether the wireless device dataset version number is different from the current network device dataset version number. If the wireless device dataset version number is not different from the current network device dataset version number then, at Event 750, the network device generates a synchronization confirmation message that includes the current network device dataset version number and the synchronization status indicator.

If the wireless device dataset version number is different from the current network device dataset version number then, at Event 730, the wireless device compiles a network device change list of data items that have a version number greater then the version number of the wireless device, as indicated in the request message and up to the network device dataset version number just prior to receiving the request message. At Event 740, a determination is made as to whether the synchronization process was successful. If the synchronization is not successful, at Event 750, a synchronization error message is generated and, at Event 760, the synchronization error message is communicated to the requesting wireless device.

If the synchronization process is determined to be successful, at Event 770, a synchronization confirmation message is generated that includes the current network device dataset version number, a synchronization status indicator and, if applicable a network device change list. At Event 780, the synchronization confirmation message is communicated to the requesting wireless device.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, either individually or in any combination, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine-readable medium and/or computer readable medium, which may be incorporated into a computer program product.

While the foregoing disclosure shows illustrative aspects and/or embodiments, it should be noted that various changes and modifications could be made herein without departing from the scope of the described aspects and/or embodiments as defined by the appended claims. Furthermore, although elements of the described embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

Thus, present aspects provide for methods, devices, systems, and computer program products for wirelessly synchronizing datasets that are stored on a wireless device and at a network device, such as a network server or database. As described, the present aspects provide for a simplified and efficient synchronization process, whereby synchronization can be completed in a single round-trip of wireless communication between the wireless device and the network device. Single round-trip communication provides for less use of network resources, shorter overall synchronization cycle times and lessens the likelihood of wireless network failures, such as call drops or the like, causing the synchronization process to fail. Additionally, simplification and efficiency are further realized by creating a synchronization process that allows the network dataset to be independent of the wireless device datasets, i.e., the network server does not require a full change history nor is the network server required to know the wireless device dataset version. Present aspects also provide for a robust synchronization process, such that, communication failures allow for re-application of the synchronization process without having to implement a full synchronization of the datasets.

Many modifications and other aspects will come to mind to one skilled in the art to which this invention pertains having the benefit of the teachings presented in the foregoing descriptions and the associated drawings. Therefore, it is to be understood that the aspect is not to be limited to the specific aspects disclosed and that modifications and other aspects are intended to be included within the scope of the appended claims. Although specific terms are employed herein, they are used in a generic and descriptive sense only and not for purposes of limitation. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for synchronization of a dataset on a wireless device, the method comprising:
   generating, by the wireless device, a synchronization request message for the dataset that includes a current wireless device dataset version number that identifies a wireless device version of the dataset that is maintained on the wireless device and a wireless device change list that identifies one or more changed data items in the wireless device dataset;
   communicating, wirelessly by the wireless device, the synchronization request message to a network device;
   receiving, wirelessly by the wireless device, in response to the communication of the synchronization request message, a synchronization confirmation message that includes a network device dataset version number that identifies a network device version of the dataset as maintained on the network device and a network device dataset change list that identifies one or more changed data items in the network device dataset, the one or more changed data items in the network device dataset being different than the one or more changed data items in the wireless device dataset; and updating the wireless device dataset to reflect changes indicated by both the (i) wireless device change list and the (ii) network device dataset change list, wherein the synchronization request message and the synchronization confirmation message are operable to provide synchronization based on a single round-trip of communication between the wireless device and the network device.

2. The method of claim 1, wherein the generating further comprises:

verifying status of a change indicator for each data item in the wireless device dataset;

compiling the wireless device change list that includes the one or more changed data items in the wireless device dataset based on the change indicator for one or more of the data items in the wireless device dataset indicating a change; and including the wireless device change list in the synchronization request message.

3. The method of claim 1, further comprising changing the current wireless device dataset version number to the network device dataset version number if the network device dataset version number in the synchronization confirmation message differs from the current wireless device dataset version number.

4. The method of claim 1, wherein the synchronization request message and the synchronization confirmation message are communicated via a lightweight, array-supporting, data-interchange carrier protocol.

5. The method of claim 4, wherein the synchronization request message and the synchronization confirmation message are communicated via JavaScript Object Notation (JSON) protocol.

6. The method of claim 1, wherein the synchronization confirmation message includes a synchronization status indicator chosen from the group consisting of a synchronization success indicator and a synchronization failure indicator.

7. The method of claim 6, wherein the synchronization confirmation message includes the synchronization failure indicator, further comprising:

initiating full synchronization between the wireless device and the network device based on the synchronization failure indicator.

8. The method of claim 7, further comprising:

communicating the current wireless device dataset to the network device;

receiving the network device dataset; and changing the current wireless device dataset to the network device dataset.

9. At least one processor configured for synchronization of a dataset, comprising:

a first module for generating a synchronization request message for the dataset that includes a current wireless device dataset version number that identifies a wireless device version of the dataset that is maintained on a wireless device and a wireless device change list that identifies one or more changed data items in the wireless device dataset;

a second hardware module for communicating, wirelessly, the synchronization request message to a network device;

a third module for receiving, wirelessly, in response to the communication of the synchronization request message, a synchronization confirmation message that includes a network device dataset version number that identifies a network device version of the dataset as maintained on the network device and a network device dataset change list that identifies one or more changed data items in the network device dataset, the one or more changed data items in the network device dataset being different than the one or more changed data items in the wireless device dataset; and a fourth module for updating the wireless device dataset to reflect changes indicated by both the (i) wireless device change list and the (ii) network device dataset change list, wherein the synchronization request message and the synchronization confirmation message are operable to provide synchronization based on a single round-trip of communication between the wireless device and the network device.

10. A non-transitory computer-readable medium comprising:

at least one instruction for causing a computer to generate a synchronization request message for a dataset that includes a current wireless device dataset version number that identifies a wireless device version of the dataset that is maintained on a wireless device and a wireless device change list that identifies one or more changed data items in the wireless device dataset;

at least one instruction for causing the computer to communicate, wirelessly, the synchronization request message to a network device;

at least one instruction for causing the computer to receive wirelessly, in response to the communication of the synchronization request message, a synchronization confirmation message that includes a network device dataset version number that identifies a network device version of the dataset as maintained on the network device and a network device dataset change list that identifies one or more changed data items in the network device dataset, the one or more changed data items in the network device dataset being different than the one or more changed data items in the wireless device dataset; and at least one instruction for causing the computer to update the wireless device dataset to reflect changes indicated by both the (i) wireless device change list and the (ii) network device dataset change list, wherein the synchronization request message and the synchronization confirmation message are operable to provide synchronization based on a single round-trip of communication between the wireless device and the network device.

11. An apparatus, comprising:

means for generating a synchronization request message for a dataset that includes a current wireless device dataset version number that identifies a wireless device version of the dataset that is maintained on a wireless device and a wireless device change list that identifies one or more changed data items in the wireless device dataset;

means for communicating, wirelessly, the synchronization request message to a network device; and means for receiving, wirelessly, in response to the communication of the synchronization request message, a synchronization confirmation message that includes a network device dataset version number that identifies a network device version of the dataset as maintained on the network device and a network device dataset change list that identifies one or more changed data items in the network device dataset, the one or more changed data items in the network device dataset being different than the one or more changed data items in the wireless device dataset; and means for updating the wireless device dataset to reflect changes indicated by both the (i) wireless device change list and the (ii) network device dataset change list, wherein the synchronization request message and the synchronization confirmation message are operable to provide synchronization based on a single round-trip of communication between the wireless device and the network device.

12. A wireless communication device, comprising:
a computer platform including a memory and at least one processor;
a dataset stored in the memory and including a plurality of data items; and
a synchronization module stored in the memory, executable by the at least one processor and operable to generate a synchronization request message for the dataset that includes a current wireless device dataset version number that identifies a wireless device version of the dataset that is maintained on the wireless communication device and a wireless device change list that identifies one or more changed data items in the wireless device dataset, communicate the synchronization request message to a network device, receive in response to the communication of the synchronization request message, a synchronization confirmation message that includes a network device dataset version number that identifies a network device version of the dataset as maintained on the network device and a network device dataset change list that identifies one or more changed data items in the network device dataset, the one or more changed data items in the network device dataset being different than the one or more changed data items in the wireless device dataset, and update the wireless device dataset to reflect changes indicated by both the (i) wireless device change list and the (ii) network device dataset change list,
wherein the synchronization request message and the synchronization confirmation message are operable to provide synchronization based on a single round-trip of communication between the wireless communication device and the network device.

13. The wireless communication device of claim 12, wherein the synchronization module is further operable to verify a status of a change indicator for each data item in the wireless device dataset, compile the wireless device change list that includes the one or more changed data items in the wireless device dataset based on the change indicator and including the wireless device change list in the synchronization request message.

14. The device of claim 12, wherein the synchronization module is further operable to change the current wireless device dataset version number to the network device dataset version number if the network device dataset version number in the synchronization confirmation message differs from the current wireless device dataset version number.

15. The wireless communication device of claim 12, wherein the synchronization module is further operable to receive the synchronization confirmation message wirelessly.

16. The wireless communication device of claim 12, wherein the synchronization request message and the synchronization confirmation message are communicated via a lightweight, array-supporting, data-interchange carrier protocol.

17. The wireless communication device of claim 16, wherein the synchronization request message and the synchronization confirmation message are communicated via JavaScript Object Notation (JSON) protocol.

18. The wireless communication device of claim 12, wherein the synchronization confirmation message further comprises a synchronization status indicator chosen from the group of indicators consisting of a synchronization success indicator and a synchronization failure indicator.

19. The wireless communication device of claim 18, wherein the synchronization confirmation messages includes the synchronization status indicator,
wherein the synchronizatino module is further operable to initiate full synchronization between the wireless communication device and the network device based on the synchronization failure indicator.

20. The wireless communication device of claim 19, wherein the synchronization module is further operable to:
communicate the current wireless device dataset to the network device;
receive the network device dataset in response to communicating the current wireless device dataset; and
change the current wireless device dataset to the network device dataset.

21. A method for synchronization of a dataset on a network device, the method comprising:
receiving, wirelessly, at the network device, a synchronization request message that includes a wireless device dataset version number that identifies a wireless device version of the dataset that is maintained on a wireless device and a wireless device change list that identifies one or more changed data items in the wireless device dataset;
comparing, by the network device, the wireless device dataset version number to a current network device dataset version number that identifies a network device version of the dataset as maintained on the network device;
compiling, by the network device, a network device dataset change list that identifies one or more changed data items if the comparison indicates that the wireless device dataset version number differs from the current network device dataset version number;
generating, by the network device, a synchronization confirmation message that includes the current network device dataset version number and the compiled network device dataset change list;
communicating, wirelessly by the network device, the synchronization confirmation message; and
updating the network device dataset to reflect changes indicated by both the (i) wireless device change list and the (ii) network device dataset change list,
wherein the synchronization request message and the synchronization confirmation message are operable to provide synchronization based on a single round-trip of communication between the wireless device and the network device.

22. The method of claim 21, wherein updating the network device dataset further comprises providing a deletion indicator for a set of data items that have been deleted on the wireless device dataset without deleting the set of data items from the network device dataset.

23. The method of claim 21, further comprising updating a data item version number based upon the change in the one or more changed data items, and updating the network device dataset version number to reflect the version number of a highest sequenced changed data item.

24. The method of claim 23, wherein the synchronization confirmation message includes the updated network device dataset version number and the compiled network device dataset change list.

25. The method of claim 21, wherein the synchronization request message and the synchronization confirmation message are communicated via a lightweight, array-supporting, data-interchange carrier protocol.

26. The method of claim 25, wherein the synchronization request message and the synchronization confirmation message are communicated via JavaScript Object Notation (JSON) protocol.

27. The method of claim 21, wherein the network device is unaware of the wireless device dataset version number prior to receiving the synchronization request message.

28. The method of claim 21, further comprising:
changing at least a portion of the network device dataset; and
waiting until the synchronization request message is received before performing the communicating step which includes a changed portion of the network device dataset to the wireless device within the compiled network device dataset change list.

29. At least one processor configured for synchronization of a dataset, comprising:
a first hardware module for receiving, wirelessly, at a network device, a synchronization request message that includes a wireless device dataset version number that identifies a wireless device version of the dataset that is maintained on a wireless device and a wireless device change list that identifies one or more changed data items in the wireless device dataset;
a second module for comparing the wireless device dataset version number to a current network device dataset version number that identifies a network device version of the dataset as maintained on the network device;
a third module for compiling a network device dataset change list that identifies one or more changed data items if the comparison indicates that the wireless device dataset version number differs from the current network device dataset version number;
a fourth module for generating a synchronization confirmation message that includes the current network device dataset version number and the compiled network device dataset change list;
a fifth module for communicating, wirelessly, the synchronization confirmation message; and
a sixth module for updating the network device dataset to reflect changes indicated by both the (i) wireless device change list and the (ii) network device dataset change list,
wherein the synchronization request message and the synchronization confirmation message are operable to provide synchronization based on a single round-trip of communication between the wireless device and the network device without external conflict resolution.

30. A non-transitory computer-readable medium comprising:
at least one instruction for causing a computer to receive, wirelessly, at a network device, a synchronization request message that includes a wireless device dataset version number that identifies a wireless device version of the dataset that is maintained on a wireless device and a wireless device change list that identifies one or more changed data items in the wireless device dataset;
at least one instruction for causing the computer to compare the wireless device dataset version number to a current network device dataset version number that identifies a network device version of the dataset as maintained on the network device;
at least one instruction for causing the computer to compile a network device dataset change list that identifies one or more changed data items if the comparison indicates that the wireless device dataset version number differs from the current network device dataset version number;
at least one instruction for causing the computer to generate a synchronization confirmation message that includes the current network device dataset version number and the compiled network device dataset change list;
at least one instruction for causing the computer to communicate, wirelessly, the synchronization confirmation message; and
at least one instruction for causing the computer to update the network device dataset to reflect changes indicated by both the (i) wireless device change list and the (ii) network device dataset change list,
wherein the synchronization request message and the synchronization confirmation message are operable to provide synchronization based on a single round-trip of communication between the wireless device and the network device.

31. An apparatus, comprising:
means for receiving, wirelessly, at a network device, a synchronization request message that includes a wireless device dataset version number that identifies a wireless device version of a dataset that is maintained on a wireless device and a wireless device change list that identifies one or more changed data items in the wireless device dataset;
means for comparing the wireless device dataset version number to a current network device dataset version number that identifies a network device version of the dataset as maintained on the network device;
means for compiling a network device dataset change list that identifies one or more changed data items if the comparison indicates that the wireless device dataset version number differs from the current network device dataset version number;
means for generating a synchronization confirmation message that includes the current network device dataset version number and the compiled network device dataset change list;
means for communicating, wirelessly, the synchronization confirmation message; and
means for updating the network device dataset to reflect changes indicated by both the (i) wireless device change list and the (ii) network device dataset change list,
wherein the synchronization request message and the synchronization confirmation message are operable to provide synchronization based on a single round-trip of communication between the wireless device and the network device.

32. A network device, comprising:
a computer platform including a memory and at least one processor;
a dataset stored in the memory and including a plurality of data items;
a synchronization module stored in the memory, executable by the at least one processor and operable to receive a synchronization request message that includes a wireless device dataset version number that identifies a wireless device version of a dataset that is maintained on a wireless device and a wireless device change list that identifies one or more changed data items in the wireless device dataset, compare the wireless device dataset version number to a current network device dataset version number that identifies a network device version of the dataset as maintained on the network device, compile a network device dataset change list that identifies one or more changed data items if the comparison indicates that the wireless device dataset version number differs from the current network device dataset version number, generate a synchronization confirmation message that includes the current network device dataset version number and the compiled network device dataset change list, communicate, wirelessly, the synchronization confirmation message, and update the network device dataset to reflect changes indicated by both the (i) wireless device change list and the (ii) network device dataset change list, wherein the synchronization request message and the synchronization confirmation message are operable to provide synchronization based on a single round-trip of communication between the wireless device and the network device.

33. The network device of claim 32, wherein the synchronization module is further operable to provide a deletion indicator for a set of data items that have been deleted on the wireless device dataset without deleting the set of data items from the network device dataset.

34. The network device of claim 32, wherein the synchronization module is further operable to update a data item version number based upon the change in the one or more changed data items and update the network device dataset version number to reflect the version number of a highest sequenced changed data item.

35. The network device of claim 34, wherein the synchronization confirmation message synchronization module includes the updated network device dataset version number and the compiled network device dataset change list.

36. The network device of claim 32, wherein the network device is unaware of the wireless device dataset version number prior to receiving the synchronization request message.

* * * * *